(12) United States Patent
Matoba

(10) Patent No.: US 8,677,469 B2
(45) Date of Patent: Mar. 18, 2014

(54) FIREWALL DEVICE

(75) Inventor: Kazumine Matoba, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 2036 days.

(21) Appl. No.: 11/392,775

(22) Filed: Mar. 30, 2006

(65) Prior Publication Data

US 2007/0136802 A1 Jun. 14, 2007

(30) Foreign Application Priority Data

Dec. 8, 2005 (JP) ................... 2005-354893

(51) Int. Cl.
*G06F 21/00* (2013.01)

(52) U.S. Cl.
USPC ............... 726/11; 713/153; 709/223

(58) Field of Classification Search
USPC .......................................... 726/11
See application file for complete search history.

(56) References Cited

U.S. PATENT DOCUMENTS

| | | | | |
|---|---|---|---|---|
| 5,884,033 | A * | 3/1999 | Duvall et al. | 709/206 |
| 5,987,606 | A * | 11/1999 | Cirasole et al. | 726/11 |
| 6,205,551 | B1 * | 3/2001 | Grosse | 726/25 |
| 6,389,472 | B1 * | 5/2002 | Hughes et al. | 709/229 |
| 6,496,935 | B1 * | 12/2002 | Fink et al. | 726/13 |
| 6,701,350 | B1 * | 3/2004 | Mitchell | 709/217 |
| 6,854,063 | B1 * | 2/2005 | Qu et al. | 726/13 |
| 7,207,061 | B2 * | 4/2007 | Martin | 726/11 |
| 7,472,167 | B2 * | 12/2008 | Tarquini | 709/217 |
| 7,509,673 | B2 * | 3/2009 | Swander et al. | 726/11 |
| 7,586,871 | B2 * | 9/2009 | Hamilton et al. | 370/328 |
| 7,610,377 | B2 * | 10/2009 | Petit | 709/225 |
| 2002/0099829 | A1 * | 7/2002 | Richards et al. | 709/227 |
| 2002/0133606 | A1 * | 9/2002 | Mitomo et al. | 709/229 |
| 2002/0157023 | A1 * | 10/2002 | Callahan et al. | 713/201 |
| 2002/0162026 | A1 * | 10/2002 | Neuman et al. | 713/201 |
| 2003/0014659 | A1 * | 1/2003 | Zhu | 713/200 |
| 2003/0018815 | A1 * | 1/2003 | Spicer et al. | 709/246 |
| 2003/0051165 | A1 * | 3/2003 | Krishnan et al. | 713/201 |
| 2003/0093517 | A1 * | 5/2003 | Tarquini | 709/224 |
| 2003/0123465 | A1 * | 7/2003 | Donahue | 370/401 |
| 2003/0217282 | A1 * | 11/2003 | Henry | 713/200 |
| 2004/0103278 | A1 * | 5/2004 | Abhishek et al. | 713/160 |
| 2004/0128545 | A1 * | 7/2004 | Chakravarty | 713/201 |
| 2005/0022010 | A1 * | 1/2005 | Swander et al. | 713/201 |
| 2005/0060328 | A1 * | 3/2005 | Suhonen et al. | 707/100 |
| 2005/0078824 | A1 * | 4/2005 | Malinen et al. | 380/247 |
| 2005/0111466 | A1 * | 5/2005 | Kappes et al. | 370/400 |
| 2005/0177869 | A1 * | 8/2005 | Savage et al. | 726/11 |
| 2005/0188080 | A1 * | 8/2005 | Motsinger et al. | 709/224 |
| 2005/0201412 | A1 * | 9/2005 | Philippe Janneteau et al. | 370/464 |

(Continued)

FOREIGN PATENT DOCUMENTS

JP 2005-92564 4/2005

*Primary Examiner* — Fikremariam A Yalew

(74) *Attorney, Agent, or Firm* — Staas & Halsey LLP

(57) ABSTRACT

In a firewall device protecting a specific network against an attack from an external network, a filtering object identifying portion identifies whether or not received data includes filtering object data, a filtering execution/inexecution selector transmits to a source device of the received data, when the received data includes the filtering object data, a selection request of a desire for a filtering execution or inexecution of the received data, does not select the filtering execution of the received data from the source device on a condition that a selection response indicates a desire for the filtering inexecution and the source device is authenticated, but selects the filtering execution under other conditions, and a filtering processor filters the selected received data.

8 Claims, 21 Drawing Sheets

| CONDITION | PROCESSING PATTERN | BONA FIDE/ MALA FIDE CLIENT | AUTHENTICATION | SELECTION RESPONSE | FILTERING |
|---|---|---|---|---|---|
| (1) | (a) | BONA FIDE CLIENT (INCLUDING SITE MANAGER) | DONE | DESIRE FOR INEXECUTION | INEXECUTION |
| | (b) | | | DESIRE FOR EXECUTION | EXECUTION |
| (2) | (c) | MALA FIDE CLIENT | UNDONE | DESIRE FOR INEXECUTION | EXECUTION. |
| | (d) | | | DESIRE FOR EXECUTION | |

(56) References Cited

U.S. PATENT DOCUMENTS

| | | |
|---|---|---|
| 2005/0220099 A1* | 10/2005 | Igarashi ........................ 370/389 |
| 2005/0273848 A1* | 12/2005 | Charles et al. .................. 726/11 |
| 2006/0143699 A1* | 6/2006 | Nagata et al. ................... 726/11 |
| 2007/0016937 A1* | 1/2007 | Bassett et al. ..................... 726/1 |
| 2007/0016945 A1* | 1/2007 | Bassett et al. ................... 726/11 |
| 2007/0033193 A1* | 2/2007 | Koskensilta .................... 707/10 |
| 2007/0214501 A1* | 9/2007 | Muramoto et al. ............. 726/11 |
| 2008/0005782 A1* | 1/2008 | Aziz ................................. 726/3 |

* cited by examiner

FIG.1

| CONDITION | PROCESSING PATTERN | BONA FIDE/ MALA FIDE CLIENT | AUTHENTICATION | SELECTION RESPONSE | FILTERING |
|---|---|---|---|---|---|
| (1) | (a) | BONA FIDE CLIENT (INCLUDING SITE MANAGER) | DONE | DESIRE FOR INEXECUTION | INEXECUTION |
| (2) | (b) | | | DESIRE FOR EXECUTION | EXECUTION |
| | (c) | MALA FIDE CLIENT | UNDONE | DESIRE FOR INEXECUTION | EXECUTION. |
| | (d) | | | DESIRE FOR EXECUTION | |

FIG.7

FRAME 702a

```
<html>
<head>
  <title>input form</title>
</head>
<body>
  <form method='GET' action='request.cgi'>
    <input type="text" name="field">
    <input type="submit" name="submit" value="ok">
  </form>
</body>
</html>
```

FIG.8

SELECTION REQUEST 804

FRAME 704

```
<html>
<head>
  <title>select form</title>
</head>
<body>
  <form method='GET' action='selected.cgi'>
    <select name="select">
      <option selected value="1">FILTERING INEXECUTION </option>
      <option selected value="0"> FILTERING EXECUTION </option>
    </select>
    <input type="submit" name="submit" value="ok">
  </form>
</body>
</html>
```

FIG.15

SELECTION/AUTHENTICATION REQUEST 808
FRAME 708

```
<html>
<head>
   <title>select form</title>
</head>
<body>
   <form method='GET' action='selected.cgi'>
      <select name="select">
         <option selected value="1"> FILTERING INEXECUTION </option>
         <option selected value="0"> FILTERING EXECUTION </option>
      </select>
      <imput type="password" name="password">
      <input type="submit" name="submit" value="ok">
   </form>
</body>
</html>
```

FIREWALL DEVICE

BACKGROUND OF THE INVENTION

1. Field of the Invention

The present invention relates to a firewall device, and in particular to a firewall device protecting a specific network against an attack from an external network.

2. Description of the Related Art

FIG. 21 shows an arrangement of a general network, which is composed of the Internet/intranet 400, a firewall device 100x connected to the Internet/intranet 400, a client (or a site manager) 200_1, clients 200_2-200_4 (hereinafter, occasionally represented by a reference numeral 200), and a server 300 connected to the Internet/intranet 400 through the firewall device 100x. A site 310 within the server 300 accommodates contents 301_1-301_n (hereinafter, occasionally represented by a reference numeral 301).

Services of the site 310 are provided to the client 200 from the server 300 through the Internet/intranet 400 and the firewall device 100. Similarly, the site manager 200_1 manages the site 310 on the server 300 through the Internet/intranet 400 and the firewall device 100.

The firewall device 100 is for defending an attack against the site 310. Namely, when the content 301 is disclosed to an indefinite number of clients 200, the firewall device 100 protects the content 301 within the server 300 against a mala fide (or a malicious) client 200_x (not shown). It is to be noted that the firewall device 100 is also called a Web application firewall device (WAF) 100x.

FIG. 22 shows an arrangement of the prior art firewall device 100x, which is composed of a client side transceiver 10x, a filtering object identifying portion 20x, a filtering processor 60x, and a server side transceiver 70x.

FIG. 23 shows a general filtering example of the firewall device 100x, which performs filtering to a frame 700a received from e.g. the mala fide client 200_x and transmits a frame 700b which is a result of the filtering to the server 300.

FIG. 24 shows an operation procedure example of the filtering in FIG. 23. Hereinafter, the operation procedure of the filtering will be described referring to FIGS. 22-24.

In FIG. 23, the device 100x receives the frame 700a from the mala fide client 200_x. The data in the frame 700a is e.g. . . . <script> alert('test') </script> . . . .

Steps S800 and S810: In the device 100x (see FIG. 22), the client side transceiver 10x receives the frame 700a to be provided to the filtering object identifying portion 20x. The filtering object identifying portion 20x scans the data ( . . . <script>alert('test')</script> . . . ) of the frame 700a to determine whether or not it includes an attack pattern.

Steps S810 and S830: When the attack pattern is not included, the filtering object identifying portion 20x provides the frame 700a to the server side transceiver 70x.

Steps S810 and S820: In the presence of a specific pattern used for an attack, e.g. HTML tag (<script>, </script>), the filtering object identifying portion 20x provides the frame 700a to the filtering processor 60x.

The filtering processor 60x replaces a left bracket "<" and right bracket ">" respectively indicating an HTML tag by other characters "<" and ">", and provides the frame 700b including sanitized data ( . . . < script> alert('test') </script> . . . ) to the server side transceiver 70x (see step T0 in FIG. 23). It is to be noted that when the specific pattern used for an attack is included, the filtering object identifying portion 20x may interrupt communications to the client 200_x, which is not shown.

Step S830: The server side transceiver 70x transmits the frame 700a or frame 700b received to the server 300.

Thus, the firewall device 100x performs a pattern detection and a defense targeting Cross Site Scripting (XSS), SQL (Structured Query Language) injection, or the like which is an attack for an application layer. As for the XSS attack, the application on the server 300 fails in removing a script included in an access request from the client 200_x, so that there is a vulnerability of responding in the form of a response including the above-mentioned script to the client 200. With this vulnerability, the mala fide client 200_x can make a browser of the third party read an unauthorized script to execute the unauthorized script.

When a source code of the script is included in a GET/POST message of an HTTP request from the client in the case of a defense against the XSS attack, the data is discarded or the attack is sanitized by escaping keywords. Hereinafter, both of "discarding" and "sanitizing" functions will be called "filtering". By this filtering, it is possible to prevent the mala fide client 200_x from uploading abnormal data including an unauthorized script or the like to the server 300.

Similarly, as for the SQL injection attack, the execution of an unauthorized SQL syntax can be also prevented by the filtering.

However, the filtering may be unable to be performed in advance, when data from a user (client 200_2) is used as it is in the form of an input of a Web application like a web page retrieval service.

Therefore, in a firewall device (filtering device) 100y as mentioned in a patent document 1 noted below, when an access request is received and an unauthorized code which is harmless for the server 300 but harmful for the client 200 is included in the access request, this unauthorized code (attack pattern) is stored. When an access response for the access request is received and the unauthorized code stored remains in the access response, the firewall device 100x removes the unauthorized code from the access response.

[Patent document 1] Japanese Patent Application Laid-open No. 2005-092564 (page 4, FIG. 1)

Since the discrimination of a malicious (or mala fide) code is difficult in the prior art firewall device 100x and the filtering device 100y, the filtering has been performed to all of the traffic matched with the attack pattern (filtering object data pattern). Namely, in the prior art firewall device 100x and the filtering device 100y, even when an unmalicious source device, e.g. the site manager 200_1 updates a Blog/message board in the site 310 by using GET/POST of the HTTP, unnecessary filtering is to be executed. Thus, while the security is made high, there is a problem that convenience for the site manager 200_1 and service quality are reduced.

SUMMARY OF THE INVENTION

It is accordingly an object of the present invention to provide a firewall device by which unnecessary filtering for data received from an unmalicious source device is not executed.

In order to achieve the above-mentioned object, a firewall device according to the present invention comprises: a filtering object identifying portion identifying whether or not received data includes filtering object data; a filtering execution/inexecution selector transmitting to a source device of the received data, when the received data includes the filtering object data, a selection request of a desire for a filtering execution or filtering inexecution (non-execution) of the received data, not selecting the filtering execution of the received data from the source device on a condition that a selection response to the selection request indicates the desire for the filtering inexecution and the source device is authenticated, but selecting the filtering execution of the received data under other conditions; and a filtering processor filtering the filtering object data included in the selected received data.

Namely, a filtering object identifying portion identifies whether or not data received includes filtering object data. A filtering execution/inexecution selector transmits to a source device of the received data, when the received data includes the filtering object data, a selection request of a desire or hope of a filtering execution or filtering inexecution of the received data, that is a selection request of whether or not the filtering is desired. The filtering execution/inexecution selector does not select the filtering execution of the received data from the source device on the condition that a selection response to the selection request indicates the desire for the filtering inexecution and the source device is authenticated, but selects the filtering execution of the received data under the other conditions. A filtering processor filters the received data including the filtering object data selected by the filtering execution/inexecution selector.

FIG. 1 shows a principle of the present invention, which is divided into processing patterns (a)-(d) by the conditions that the source device (client) is "authenticated"/"unauthenticated" and the selection response from the source device is "desire for filtering inexecution"/"desire for filtering execution". In the processing patterns (a)-(d), execution or inexecution of the filtering for the received data is determined. This will now be described referring to FIG. 1.

The processing pattern (a) indicates that the client (e.g. site manager) is "authenticated (bona fide)" and "desire for filtering inexecution" (non-desire for filtering), and at this time the filtering is not executed (inexecution).

The processing pattern (b) indicates that the client is "authenticated (bona fide)" and "desire for filtering execution" (desire for filtering), and at this time the filtering is executed (execution).

The processing pattern (c) indicates that the client is "not unauthenticated (may be mala fide client)" and "desire for filtering inexecution", and also at this time the filtering is executed (execution).

The processing pattern (d) indicates that the client is "unauthenticated (may be mala fide)" and "desire for filtering execution", and at this time the filtering is executed (execution).

The above-mentioned processing patterns are summarized as follows: Only in the case of "authenticated" and "desire for filtering inexecution" of the condition (1) (processing pattern (a)), the filtering is not executed. In the case of the condition (2) (processing patterns (b)-(d)) except the condition (1), the filtering is executed.

Thus, in the present invention, a function by which the desire for filtering execution/inexecution to the transmitted data of the source device itself can be selected is provided to the source device (client) authenticated (unmalicious), e.g. the site manager in a normal communication procedure. Since the selection of the desire for filtering execution/inexecution is only permitted to the source device authenticated at this time, the timing of the authentication may be any time while the authentication of the source device is required. For example, as for this timing, "before the communication", "at the time of selecting the desire for filtering execution/inexecution", or the like can be mentioned.

Thus, only when the source device (site manager) selects the filtering execution, the filtering is performed to the received data including the filtering object data from the source device authenticated. Namely, it becomes unnecessary to perform the filtering. On the other hand, the filtering is performed to all of the received data including the filtering object data from the source device (e.g. mala fide client) unauthenticated.

As a result, the convenience/service quality for the site manager can be secured, so that it becomes possible to protect a site against an attack from a mala fide client.

Also, in the present invention, the filtering execution/inexecution selector may be composed of an authentication result holder, a filtering selection requesting portion, and a filtering selector; the authentication result holder may hold an authentication result of the source device; the filtering selection requesting portion may transmit to the source device of the received data the selection request of the desire for the filtering execution/inexecution of the received data; and the filtering selector may not select the filtering execution of the received data including the filtering object data from the source device on the condition that the selection response to the selection request indicates the desire for the filtering inexecution and the source device is authenticated in the authentication result, but may select the filtering execution of only another received data including the filtering object data under the other conditions.

Namely, the filtering execution/inexecution selector is composed of a filtering selection requesting portion, an authentication result holder, and a filtering selector. The authentication result holder holds an authentication result of the source device. The filtering selection requesting portion transmits to the source device of the received data the selection request of the desire for the filtering execution/inexecution of the received data; and the filtering selector does not select the filtering execution of the received data including the filtering object data from the source device on the condition that the selection response to the selection request indicates the desire for the filtering inexecution and the source device is authenticated in the authentication result (condition (1), processing pattern (a)). Under the other conditions (condition (2), processing patterns (b)-(d)) the filtering selector selects the filtering execution of only another received data including the filtering object data.

Hereafter, the filtering processor filters the filtering object data included in the selected received data. As a result, only the source device authenticated (unmalicious) can select the desire for filtering inexecution. Namely, while it becomes unnecessary to perform the filtering of the received data from the source device authenticated, the filtering of all of the received data including the filtering object data from the source device unauthenticated is executed.

Also, in the present invention, the filtering execution/inexecution selector may be composed of an authentication result holder, a filtering selection requesting portion, and a filtering selector; the authentication result holder may hold an authentication result of the source device; the filtering selection requesting portion may select the filtering execution of the received data when the source device is unauthenticated in the authentication result, and may transmit the selection request to the source device authenticated in the authentication result; and the filtering selector may not select the filtering execution of the received data from the source device authenticated on the condition that the selection response to the selection request indicates the desire for the filtering inexecution, but may select the filtering execution of another received data including the filtering object data under the other conditions.

Namely, the filtering execution/inexecution selector is composed of a filtering selection requesting portion, an authentication result holder, and a filtering selector. The authentication result holder holds the authentication result (authentication is done or undone) of the source device. The filtering selection requesting portion checks whether or not the source device is authenticated based on the authentication result, and selects the filtering execution of the received data to be transferred to the filtering processor when the source device is unauthenticated in the authentication result (processing patterns (c) and (d)). On the other hand, the filtering selection requesting portion transmits the selection request of the desire for the filtering execution or inexecution of the received data to the source device authenticated in the authentication result. The filtering selector does not select the filtering execution of the received data from the source device authenticated on the condition that the selection response to the selection request indicates the desire for the filtering inexecution (condition (1), processing pattern (a)), but selects the filtering execution of another received data including the filtering object data under the other conditions (processing pattern (b)). Hereafter, the filtering processor will filter the filtering object data included in the received data selected.

Thus, only the source device authenticated can select inexecution of the filtering. Namely, while it becomes unnecessary to perform the filtering of the received data from the source device authenticated, the filtering of all of the received data including the filtering object data from the source device unauthenticated is executed.

Furthermore, it becomes unnecessary to transmit/receive the selection request of the desire for filtering execution/inexecution and the selection response that is a response for the selection request except the source device (e.g. site manager) which has been preliminarily authenticated. As a result, security becomes higher.

Also, the present invention may further comprise an authentication processor; the filtering selection requesting portion may further transmit an authentication request to the source device, and the authentication processor may perform an authentication of the source device based on an authentication response to the authentication request and may register the authentication result in the authentication result holder.

Namely, the filtering selection requesting portion transmits an authentication request to the source device. The authentication request and the selection request may be performed concurrently. An authentication processor performs authentication of the source device based on the authentication response to the authentication request and registers the authentication result in the authentication result holder. It is to be noted that the filtering selection requesting portion may omit the authentication without transmitting the authentication request when the authentication result of the source device is held in the authentication result holder.

Thus, compared with the case of preliminarily performing an authentication, the source device (site manager) confirms the authentication only when data including the filtering object data is transmitted. Therefore, the site manager's inputting labor is omitted, thereby improving the convenience.

Also, the present invention may further comprise a filtering policy holder holding a filtering policy which determines the filtering execution/inexecution of the received data in association with parameters included in the received data; and the filtering object identifying portion may provide the received data to the filtering execution/inexecution selector only when the filtering policy determines the filtering execution.

Also, in the present invention, the filtering may comprise sanitizing the filtering object data, or discarding the received data.

Also, in the present invention, the filtering object data may be preset in the filtering object identifying portion.

Also, in the present invention, the filtering selection requesting portion may transmit the authentication request and the selection request concurrently to the source device.

Furthermore, in the present invention, the parameters may comprise a destination address, an URL, or a variable value designated by a GET or a POST of the received data to determine the filtering policy based on the parameters.

Thus, it becomes possible to designate the filtering execution/inexecution to e.g. a specific site/input field.

As described above, by the firewall device according to the present invention, the execution of unnecessary filtering for received data from an unmalicious source device can be omitted. As a result, it becomes possible to highly secure convenience/service quality for the site manager which is e.g. the bona fide client and to protect e.g. the site against an attack of a malicious client.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 1 is a diagram showing a principle of a firewall device according to the present invention;

FIG. 7 is a diagram showing a description example of a frame 702a (form.htm) in embodiments (1)-(4) of a firewall device according to the present invention;

FIG. 8 is a diagram showing a description example of a frame 704 (selected.cgi) in embodiments (1), (2), (4) of a firewall device according to the present invention;

FIG. 15 is a diagram showing a description example of a frame 704 (selected.cgi) in an embodiment (3) of a firewall device according to the present invention;

DESCRIPTION OF THE EMBODIMENTS

Figure 2:
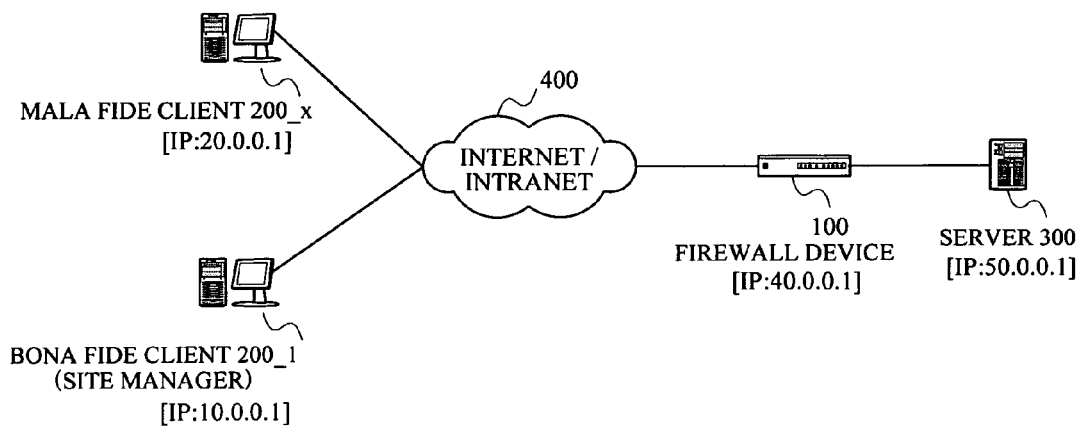
FIG. 2 is a block diagram showing an arrangement of a network in embodiments (1)-(4) of a firewall device according to the present invention.

FIG. 2 shows a general network arrangement including a firewall device 100 of the present invention. In this network, a client (IP address=10.0.0.1) 200_1 and a client (IP address=20.0.0.1) 200_x (hereinafter, reference numerals 200_1 and 200_x may be occasionally represented by a reference numeral 200) can access a site 310 (not shown) included in a server (IP address=50.0.0.1) 300 through the Internet/intranet 400 and the firewall device (IP address=40.0.0.1) 100.

Hereinafter, embodiments (1)-(4) will be described based on the network arrangement shown in FIG. 2. Also, it is supposed that the site manager uses the client 200_1 and a mala fide user uses (may use) the client 200_x in this description. It is also supposed that the server 300 and the client 200 perform communications by HTTP and each client 200 uploads data to the server 300 by a GET or POST message of the HTTP. Also, a communication procedure of a communication layer (TCP, UDP, or the like) not directly related to the firewall device 100 of the present invention is hereby omitted and only the procedure directly related to the HTTP will be described.

Furthermore, it is supposed that in the presence of "<script>" and "</script>", the filtering of the firewall device 100 converts the parts of "<" (left bracket) and ">" (right bracket) respectively into "<" and ">".

It is to be noted that while the following description deals with an example of the case where all of the data in a single frame is transmitted for simplifying the description, the data may extend across a plurality of frames.

Embodiment (1)

Figure 3:
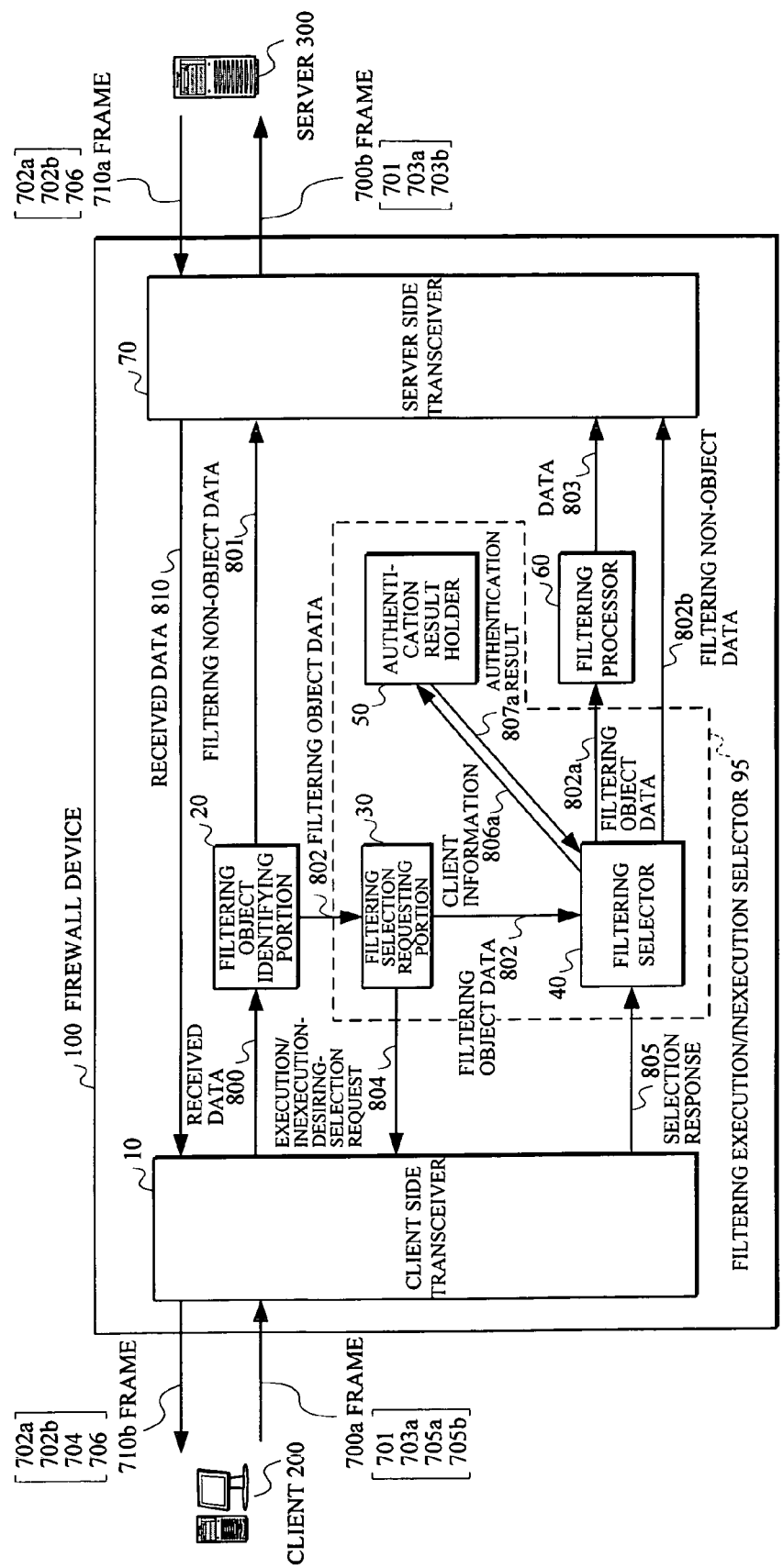
FIG. 3 is a block diagram showing an arrangement by an embodiment (1) of a firewall device according to the present invention.
Figure 22:
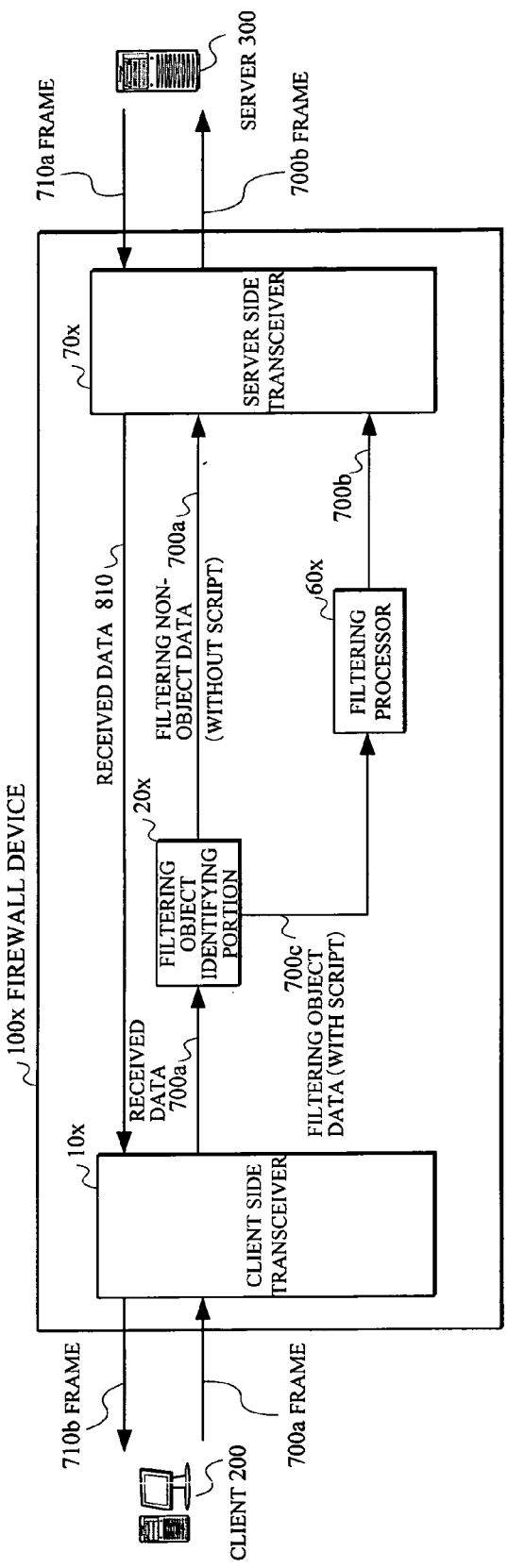
FIG. 22 is a block diagram showing an arrangement of a prior art firewall device.
Figure 23:
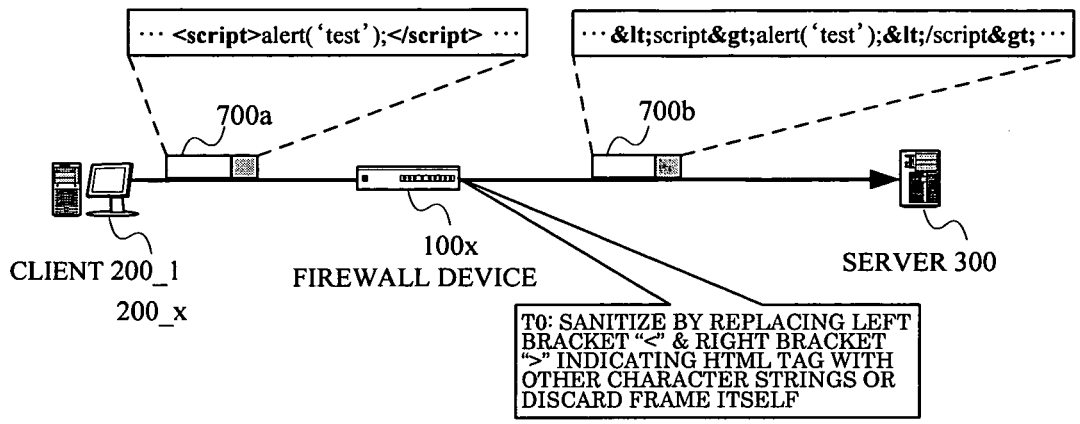
FIG. 23 is a block diagram showing filtering in a general firewall device.
Figure 24:
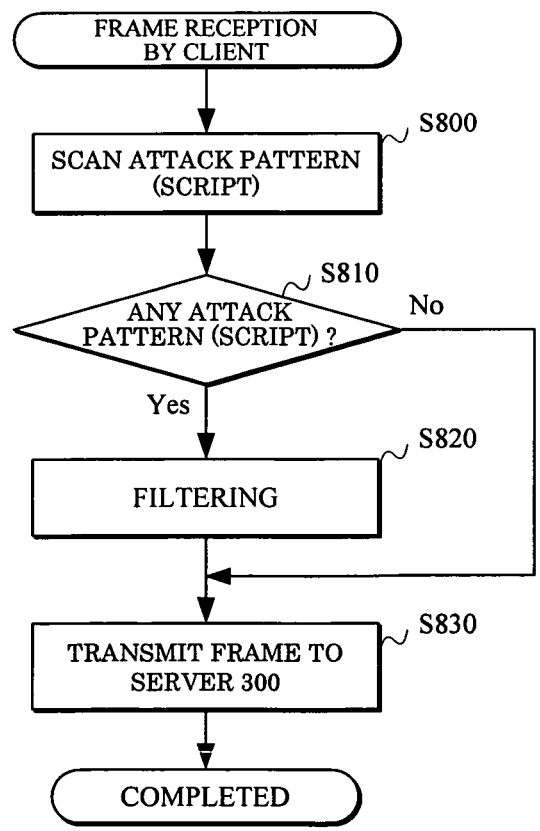
FIG. 24 is a flowchart showing an operation procedure of a prior art firewall device.

FIG. 3 shows an arrangement of the firewall device 100 of the present invention in the embodiment (1). This device 100 is different from the prior art firewall device 100x shown in FIG. 22 in that a filtering execution/inexecution selector 95 is added (see dashed line part). The selector 95 is composed of a filtering selection requesting portion 30, a filtering selector 40, and an authentication result holder 50.

Hereinafter, the operations of functional portions 10-70 including the above-mentioned functional portions will be described. It is to be noted that in the following description, frames transmitted/received to/from the firewall device 100 (client side transceiver 10) by the client 200 are respectively made a frame 700a and a frame 710b, and frames transmitted/received to/from the firewall device 100 (server side transceiver 70) by the server 300 are respectively made a frame 710a and a frame 700b. Reference numerals 700a, 700b, 710a, and 710b of the frames respectively represent reference numerals 701, 703a, 705a, 705b, 701, 703a, 703b, 702a, 706, 702a, 704, 706 in FIGS. 6, 9, 10, 13, and 18 showing the flows of the frames as will be described later.

Description of the Functional Portions (1) Client side transceiver 10: When receiving the frame 700a which is not a selection response 805 from the client 200, the transceiver 10 transfers the frame 700a as received data 800 to the filtering object identifying portion 20. When the frame 700a is the selection response 805, the transceiver 10 transfers the selection response 805 to the filtering selector 40. Also, the transceiver 10 transmits an execution/inexecution desiring a selection request 804 from the filtering selection requesting portion 30 as the frame 710b to the client 200. Furthermore, the transceiver 10 transmits the received data 810 from the server side transceiver 70 as the frame 710b to the client 200.

(2) Filtering object identifying portion 20: This identifying portion 20 analyzes the payload part of the received data 800. When a character string of "<script>" or "</script>" is included in the content of "GET" and "POST", the identifying portion 20 transfers the received data 800 as filtering object data 802 to the filtering selection requesting portion 30. If it is not included, the identifying portion 20 transfers the received data 800 as filtering non-object data 801 to the server side transceiver 70.

(3) Filtering selection requesting portion 30: This requesting portion 30 transfers to the client side transceiver 10 the selection request 804 requesting the source address of the filtering object data 802 received to select either the "desire for filtering execution" or the "desire for filtering inexecution".

(4) Filtering selector 40: This selector 40 receives the selection response 805 indicating the selection result of the "filtering execution/inexecution" having received from the client side transceiver 10, provides client information 806a which is information of the source client 200 of the selection response 805 to the authentication result holder 50, and reads an authentication result 807b of the client 200 from the authentication result holder 50. In the case of the selection response 805="desire for filtering inexecution" and the authentication result 807b="authenticated (already authenticated)", the selector 40 transfers to the server side transceiver 70 a filtering non-object data 802b in which a GET/POST parameter included in the filtering object data 802 transferred from the filtering selection requesting portion 30 is left as it is. In the case of the authentication result 807b="unauthenticated (not yet authenticated)" or the selection response 805="desire for filtering execution", the selector 40 transfers to the filtering processor 60 filtering object data 802a in which the GET/POST parameter included in the filtering object data 802 is left as it is.

(5) Filtering processor 60: When receiving the filtering object data 802a from the filtering selector 40, the filtering processor 60 scans the data 802a, replaces the characters of "<" and ">" in the "<script>" and "</script>" with "<" and ">", and transfers the replaced data 803 to the server side transceiver 70.

(6) Authentication result holder 50: It is supposed that the authentication has been preliminarily performed with the client 200 and an address (10.0.0.1) of the client 200 has been registered in this embodiment (1).

Figure 4:
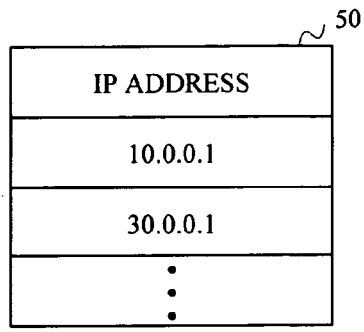
FIG. 4 is a diagram showing an arrangement of an authentication result holder in a firewall device according to the present invention.

FIG. 4 shows an arrangement of the authentication result holder 50, in which IP address information="10.0.0.1", "30.0.0.1", ... of the client 200 preliminarily authenticated or the like is held. When e.g. the client information 806a="10.0.0.1" is provided, the authentication result holder 50 confirms that "10.0.0.1" is preliminarily registered by referring to the IP address, and responds the authentication result 807b="authenticated".

(7) Server side transceiver 70: This transceiver 70 transfers the frame 710a from the server 300 to the client side transceiver 10. The transceiver 70 transfers the data transferred from the internal functional portions to the server 300 as the frame 700b. Requirements of the processing patterns (a)-(d) of the embodiment (1) and the embodiments (2)-(4) described later will now be described (see FIG. 1).

Processing pattern (a): This is a case where the client (site manager) 200_1 uploads data including a script (attack pattern) to the server 300, and the "desire for filtering inexecution" is selected.

Processing pattern (b): This is a case where the client (site manager) 200_1 uploads data including a script (attack pattern) to the server 300, and the "desire for filtering execution" is selected.

Processing pattern (c): This is a case where a mala fide client 200_x uploads data including a script (attack pattern) to the server 300, and the "desire for filtering inexecution" is selected.

Processing pattern (d): This is a case where a mala fide client 200_x uploads data including a script (attack pattern) to the server 300, and the "desire for filtering execution" is selected.

Only in the case of processing pattern (a), the filtering is not executed, while in the case of other processing patterns (b)-(d), the filtering is executed.

Hereinafter, operation procedures of the processing patterns (a)-(d) in the embodiment (1) will be described. Since the processing pattern (d) has the same result as that of the processing pattern (b), only operation procedures of the processing patterns (a)-(c) will be described.

Figure 5:
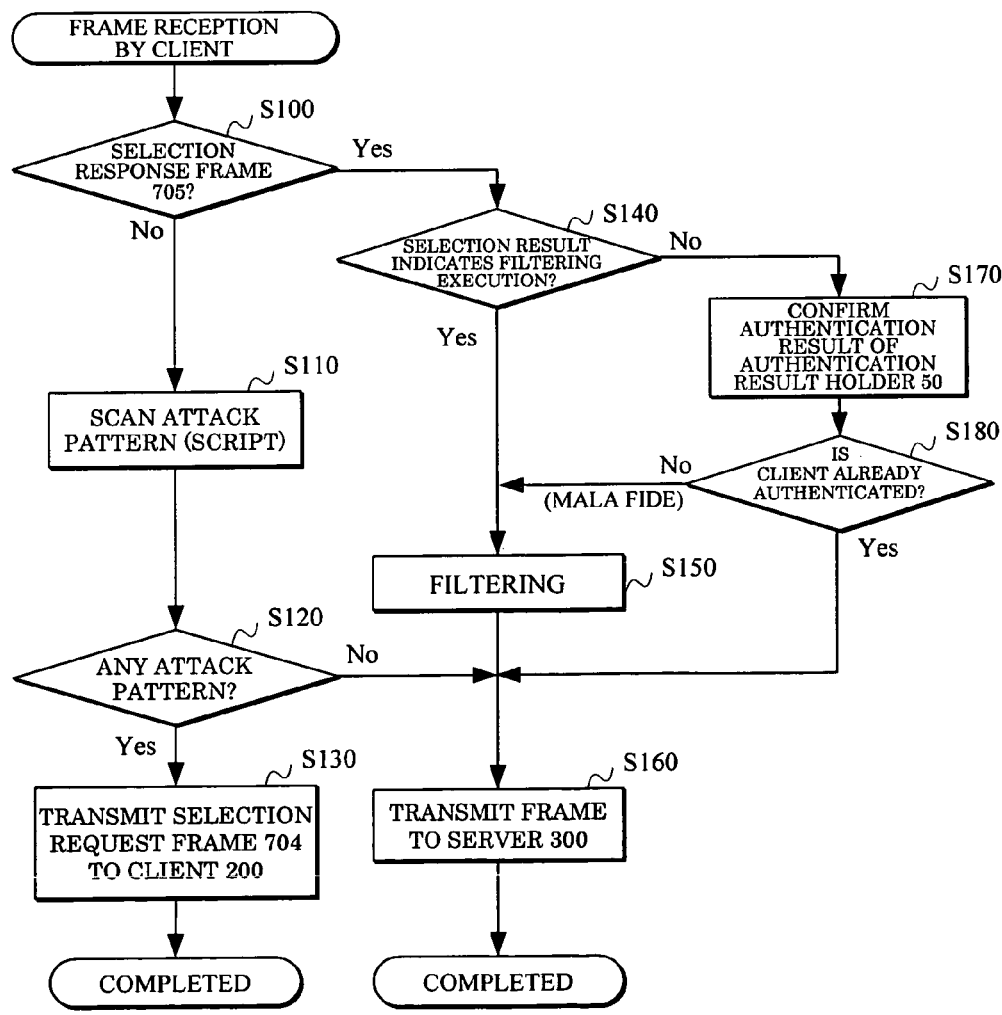
FIG. 5 is a flowchart showing an operation procedure example in an embodiment (1) of a firewall device according to the present invention.
Figure 6:
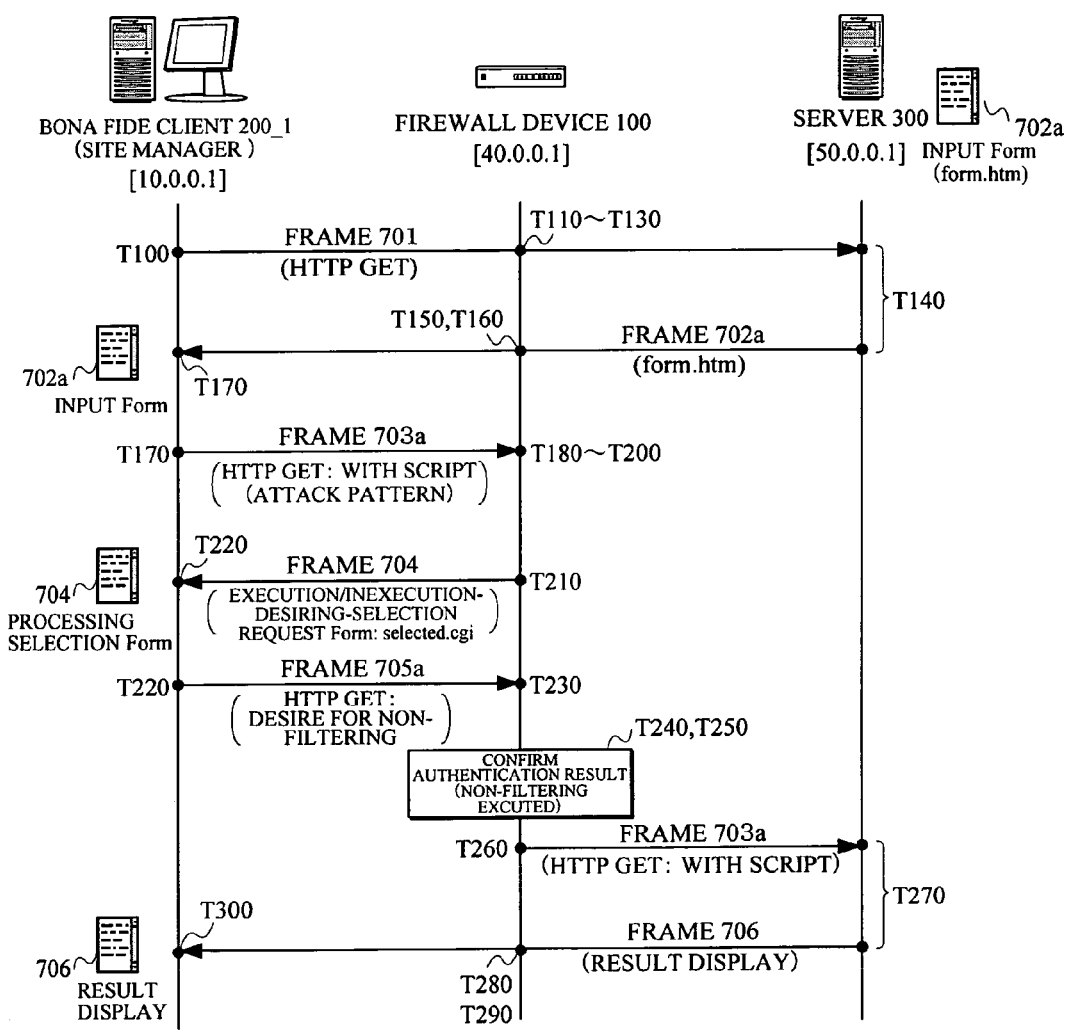
FIG. 6 is a diagram showing a frame flow of a processing pattern (a) of an arrangement (1) of a firewall device according to the present invention.

FIGS. 5 and 6 respectively show an operation procedure example of the firewall device 100 in the embodiment (1) and a flow of a frame in the processing pattern (a).

Processing Pattern (a)

The processing pattern (a) in the embodiment (1), i.e. the case where the client (site manager) 200_1 uploads data including the script (attack pattern) to the server 300 and "desire for filtering inexecution" is selected will now be described referring to FIGS. 3, 5, and 6.

Step T100: The client (site manager) 200_1 transmits the frame 701 addressed to the IP address (50.0.0.1) of the server 300 (see FIG. 6). This frame 701 is for acquiring an input form (input "form.htm") including a GET request example of the HTTP: GET http://www.test.com/form.htm HTTP/1.0¥r¥n . . . .

Step T110: In the firewall device 100, the client side transceiver 10 receives the frame 701. Since this frame 701 is not the selection response frame, the transceiver 10 transfers the frame 701 as the received data 800 to the filtering object identifying portion 20 (see FIG. 3 and "No" at step S100 of FIG. 5).

Step T120: The filtering object identifying portion 20 scans the content of the frame (GET request) 701. Since there is found no attack pattern (<script>, </script> or the like), the identifying portion 20 transfers the frame 701 to the server side transceiver 70 (see "No" at steps S110 and S120).

Step T130: The server side transceiver 70 transfers the frame 701 to the server 300 (see step S160).

Step T140: The server 300 receives the frame 701. Since the frame 701 is the GET request of "form.htm", the server 300 transmits the frame 702a including the "form.htm" to the IP address (10.0.0.1) of the client 200_1.

FIG. 7 shows a description example of "form.htm" included in the frame 702a.

Step T150: In the firewall device 100, the server side transceiver 70 receives the frame 702a and transfers the frame 702a to the client side transceiver 10.

Step T160: The client side transceiver 10 transfers the frame 702a to the site manager 200_1.

Step T170: The client 200_1 receives the frame 702a, and writes data including the script in a "field area" of the "form.htm", thereby transmitting to the IP address (50.0.0.1) of the server 300 the frame 703a including the GET request example of the HTTP: GET http://www.test.com/request.cgi?submit=ok&field=<script>alert-('test')</script>HTTP/1.0¥r¥n . . . .

Step T180: In the firewall device 100, the client side transceiver 10 receives the frame 703a, and transfers the frame 703a to the filtering object identifying portion 20 (see "No" at step S100).

Step T190: The filtering object identifying portion 20 scans the received frame (GET request) 703a. Since the frame 703a includes the attack pattern "<script>" or the like, the identifying portion 20 transfers it to the filtering selection requesting portion 30 as the filtering object data 802 (see FIG. 3) (see "Yes" at steps S110 and S120).

Step T200: The filtering selection requesting portion 30 transfers the received data 802 (frame 703a) to the filtering selector 40. Furthermore, the filtering selection requesting portion 30 transfers to the client side transceiver 10 the execution/inexecution-desiring-selection request 804 (frame 704) including the input form "selected.cgi" for a "filtering execution/inexecution" selection request addressed to the IP address (10.0.0.1) of the client 200_1 that is the source of the data 802. For the source of the frame 704 at this time, the IP address (50.0.0.1) of the server 300 is set so that the frame 704 may be seen as the response to "request.cgi (see GET request at step T170) from the client 200_1. It is to be noted that this device 100 may be led to once transmit a redirect message of the HTTP to the client 200_1 and to newly acquire the input form for this device (40.0.0.1) 100 from the client 200_1 instead of directly responding to the input form.

FIG. 8 shows a description example of "selected.cgi" included in the frame 704 (selection request 804). The "selected.cgi" includes a "filtering inexecution/execution selection" filed.

Step T210: The client side transceiver 10 transfers the frame 704 to the client 200_1 (see step S130).

Step T220: The client 200_1 receives the frame 704. It is supposed that the site manager of the client 200_1 has selected the "desire for filtering inexecution (select=1)" for the filtering in "select area" (see FIG. 8) of "selected.cgi" of the frame 704. The client 200_1 transmits to the IP address (50.0.0.1) of the server 300 the frame 705a including the GET request example of the HTTP in which the above-mentioned input result "select=1" is set: GET http://www.test.com/selected.-cgi?submit=ok&select=1 HTTP/1.0¥r¥n . . . .

Step T230: In the firewall device 100, the client side transceiver 10 identifies that the frame 705a is a response to the selection page "selected.cgi", i.e. the response to the frame 704 (see "Yes" at step S100), and transfers the frame 705a as the selection response 805 to the filtering selector 40.

Step T240: Since the frame 705a is "select=1", the filtering selector 40 determines the "desire for filtering inexecution (select=1)", and checks whether or not the information (IP address (10.0.0.1)) of the client (site manager) 200_1 is registered in the authentication result holder 50 (see "No" at step S140 and S170).

Step T250: Since the client 200_1 is the site manager and the information (IP address (10.0.0.1)) of the client 200_1 is preliminarily registered in the authentication result holder 50 (see FIG. 4), the authentication result holder 50 responds an authentication result 807a="authenticated" to the filtering selector 40. The filtering selector 40 having received the authentication result 807a transfers the filtering object data 802 (frame 703a) as the filtering non-object data 802b to the server side transceiver 70 (see "Yes" at step S180).

Step T260: The server side transceiver 70 transmits the above-mentioned frame 703a to the server 300 (at step S160).

Step T270: The server 300 receives the above-mentioned frame 703a, processes the data including "<script>alert ('test')</script>" in the "field area", and transmits the frame 706 including the page indicating the processing result addressed to the IP address (10.0.0.1) of the client 200_1.

Step T280: In the firewall device 100, the server side transceiver 70 receives the frame 706 to be transferred to the client side receiver 10.

Step T290: The client side transceiver 10 transfers the frame 706 to the client 200_1.

Step T300: The client 200_1 receives the above-mentioned frame 706, and displays the processing result to the site manager.

Namely, the script <script>alert('test')</script> is executed.

Processing Pattern (b)

The processing pattern (b) in the embodiment (1), i.e. the case where the client (site manager) 200_1 uploads the data including the script (attack pattern) to the server 300 and the "desire for filtering execution" is selected will now be described.

Figure 9:
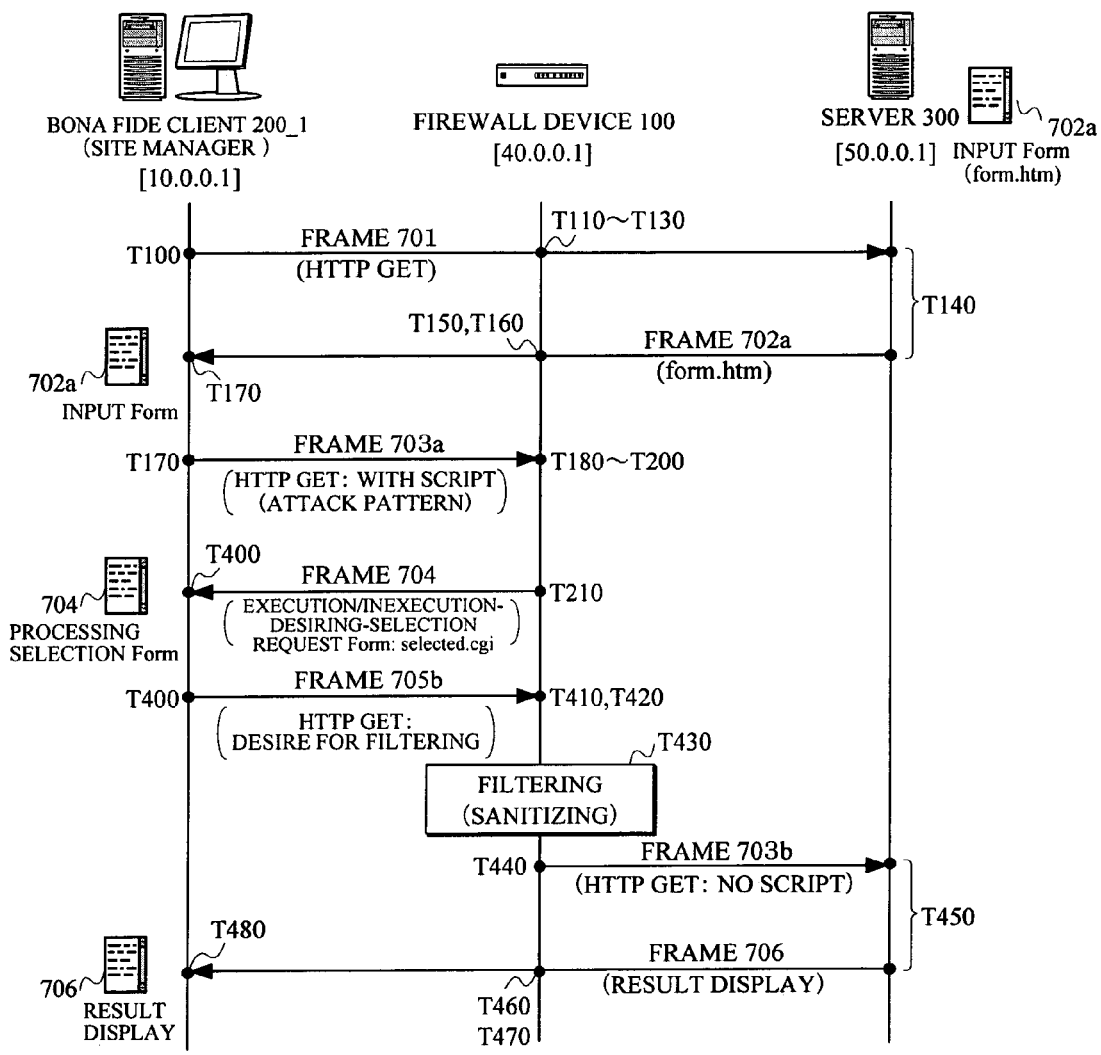
FIG. 9 is a diagram showing a frame flow of a processing pattern (b) of an arrangement (1) of a firewall device according to the present invention.

FIG. 9 shows a flow of a frame of the processing pattern (b). The operation procedure of the processing pattern (b) will now be described referring to FIGS. 9, 3, and 5.

It is to be noted that since steps T100-T210 in FIG. 9 are the same as steps T100-T210 of the processing pattern (a) shown in FIG. 6, the descriptions thereof are here omitted.

Step T400: The client 200_1 receives the frame 704 (selection request 804). It is supposed that the site manager has selectively inputted the "desire for filtering execution (select=0)" for the filtering in the "select area" of the input form of the frame 704. The client 200_1 transmits to the IP address (50.0.0.1) of the server 300 the GET request example of the HTTP including the selection input: GET http://www.test.com/selected.cgi?submit=ok&select=0 HTTP/1.0¥r¥n . . . , i.e. the frame 705b.

Step T410: In the firewall device 100, the client side transceiver 10 identifies that the frame 705b is a response frame for the selection page "selected.cgi" (frame 704) (see "Yes" at step S100 of FIG. 5), and transfers the frame 705b to the filtering selector 40 as the selection response 805.

Step T420: Since the selection response 805 (frame 705b) is the "select=0", the filtering selector 40 determines the "desire for filtering execution" (see "Yes" at step S140), and transfers the frame 703a (filtering object data 802) as the filtering object data 802a to the filtering processor 60 (see FIG. 3).

Step T430: The filtering processor 60 transfers to the server side transceiver 70 the data 803 which is the frame 703a (data 802a) filtered, i.e. the data 803 in which the part of "<script>alert('test')</script>" in the data 802a is converted into "< script> alert('test')< /script>" (see step S150 and FIG. 3).

Step T440: The server side transceiver 70 transmits the data 803 as the frame 703b to the server 300 (see step S160).

Step T450: The server 300 receives the frame 703b, processes the data including "< script> alert('test')< /script>" in the "field area", and transmits the frame 706 including the page displaying the processing result to the IP address (10.0.0.1) of the client 200_1.

Step T460: In the firewall device 100, the server transceiver 70 receives the frame 706 to be transferred as the received data 810 to the client side transceiver 10.

Step T470: The client side transceiver 10 transfers the frame 706 (received data 810) to the client 200_1.

Step T480: The client 200_1 receives the frame 706, and displays the processing result to the site manager. Namely, the character string <script>alert('test') </script> is displayed, indicating that the script is not executed.

Processing Pattern (c)

Hereinafter, the processing pattern (c) in the embodiment (1), i.e. the case where a mala fide client 200__x uploads the data including the script (attack pattern) to the server 300 and the "desire for filtering inexecution" is selected will be described.

Figure 10:
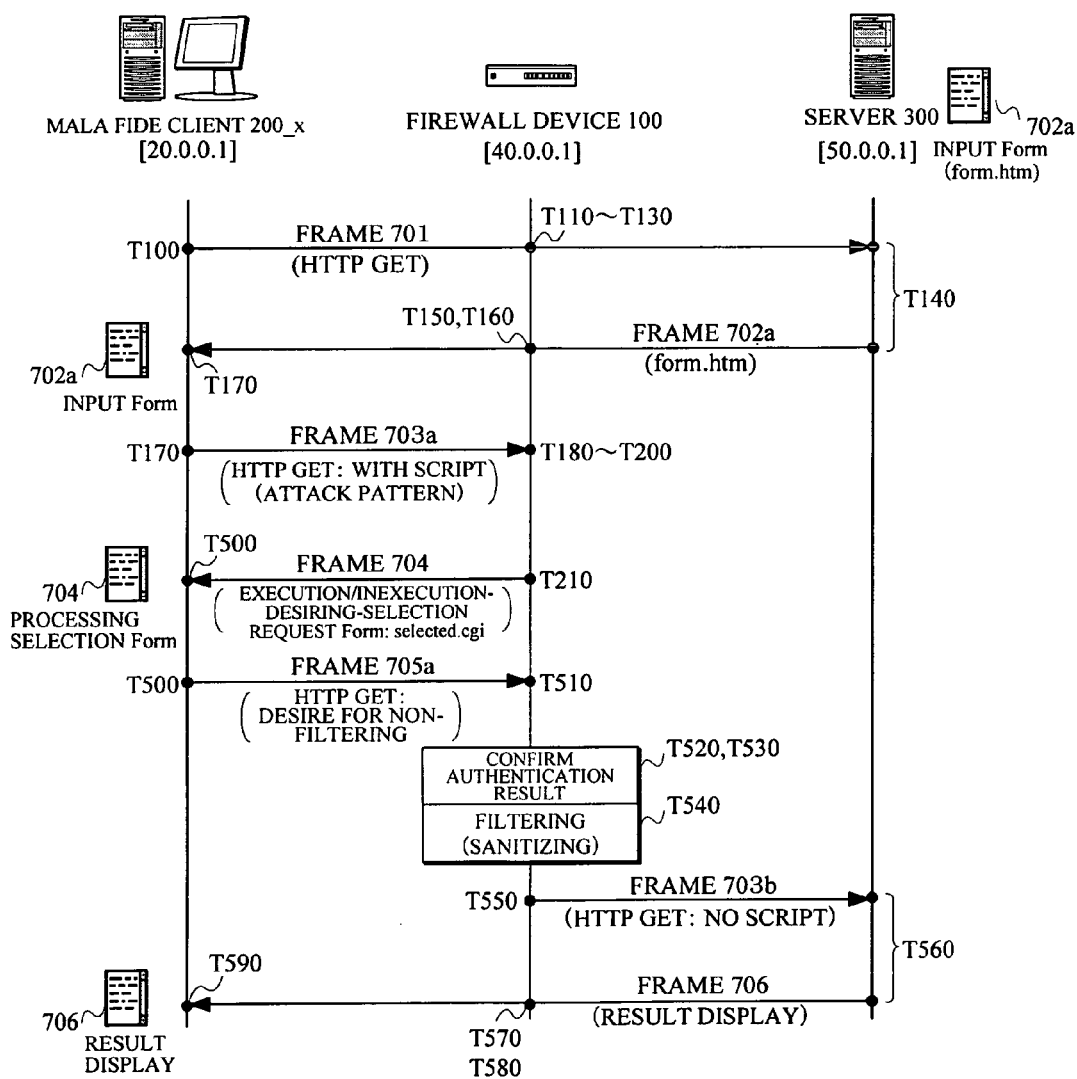
FIG. 10 is a diagram showing a frame flow of a processing pattern (c) of an arrangement (1) of a firewall device according to the present invention.

FIG. 10 shows a frame flow of the processing pattern (c). The operation procedure example of the processing pattern (c) in this embodiment (1) will now be described referring to FIGS. 10, 3, and 5.

It is to be noted that since the client (site manager) 200_1 is replaced by the mala fide client 200__x at steps T100-T210 in FIG. 10, and the operation procedure is the same as that of steps T100-T210 of the processing pattern (c) shown in FIG. 6, the descriptions thereof are here omitted.

Step T500: It is supposed that the mala fide client 200__x has received the frame 704, and has selectively inputted the "desire for filtering inexecution (select=1)" for the filtering to the "select area" of the input form of the frame 704 (selection request 804). The client 200__x transmits to the IP address (50.0.0.1) of the server 300 the frame 705a including the GET request example of the HTTP indicating the selection input: GET http://www.test.com/selected.cgi?submit=ok&select=1 HTTP/1.0¥r¥n . . . ).

Step, T510: In the firewall device 100, the client side transceiver 10 identifies that the frame 705a is a response to the selection page "selected.cgi" (frame 704 (selection request 804)), and transfers the frame 705a as the selection response 805 to the filtering selector 40 (see "Yes" at step S100 of FIG. 5).

Step T520: Since the frame 705a is "select=1", the filtering selector 40 determines the "desire for filtering inexecution", and checks whether or not IP address (20.0.0.1) information of the client 200__x is registered in the authentication result holder 50 (at steps S140 and S170).

Step T530: Since the client 200__x is not a site manager and the information of the client 200__x is not registered in the authentication result holder 50, the filtering selector 40 transfers the filtering object data 802 (see FIG. 3) which is the frame 703a to the filtering processor 60 (see "No" at step S180).

Step T540: The filtering processor 60 transfers to the server side transceiver 70 data 803 (see FIG. 3) in which the part of the "<script>alert('test')</script>" of the frame 703a (data 802) is converted into (perform filtering) "< script> alert ('test')-< /script>" (see step S150).

Step T550: The server side transceiver 70 transmits the data 803 as the frame 703b to the server 300.

Step T560: The server 300 receives the frame 703b, processes the data including "< script> alert('test')< /script>" in the "field area", and transmits to the IP address (20.0.0.1) of the client 200__x the frame 706 including the page indicating the processing result.

Step T570: In the firewall device 100, the server side transceiver 70 receives the frame 706 to be transferred as the received data 810 to the client side transceiver 10.

Step T580: The client side transceiver 10 transfers the received data 810 as the frame 706 to the client 200__x.

Step T590: The client 200__x receives the frame 706, and displays the processing result to a mala fide client. Namely, the character string <script>alert('test')</script> is displayed, indicating that the script is not executed.

While it is possible to perform both the "filtering execution" and the "filtering inexecution" to the site manager registered in the authentication result holder 50 by the above-mentioned processing patterns (a)-(c), it becomes possible to always execute the filtering for other clients (e.g. mala fide client) unregistered.

Embodiment (2)

Figure 11:
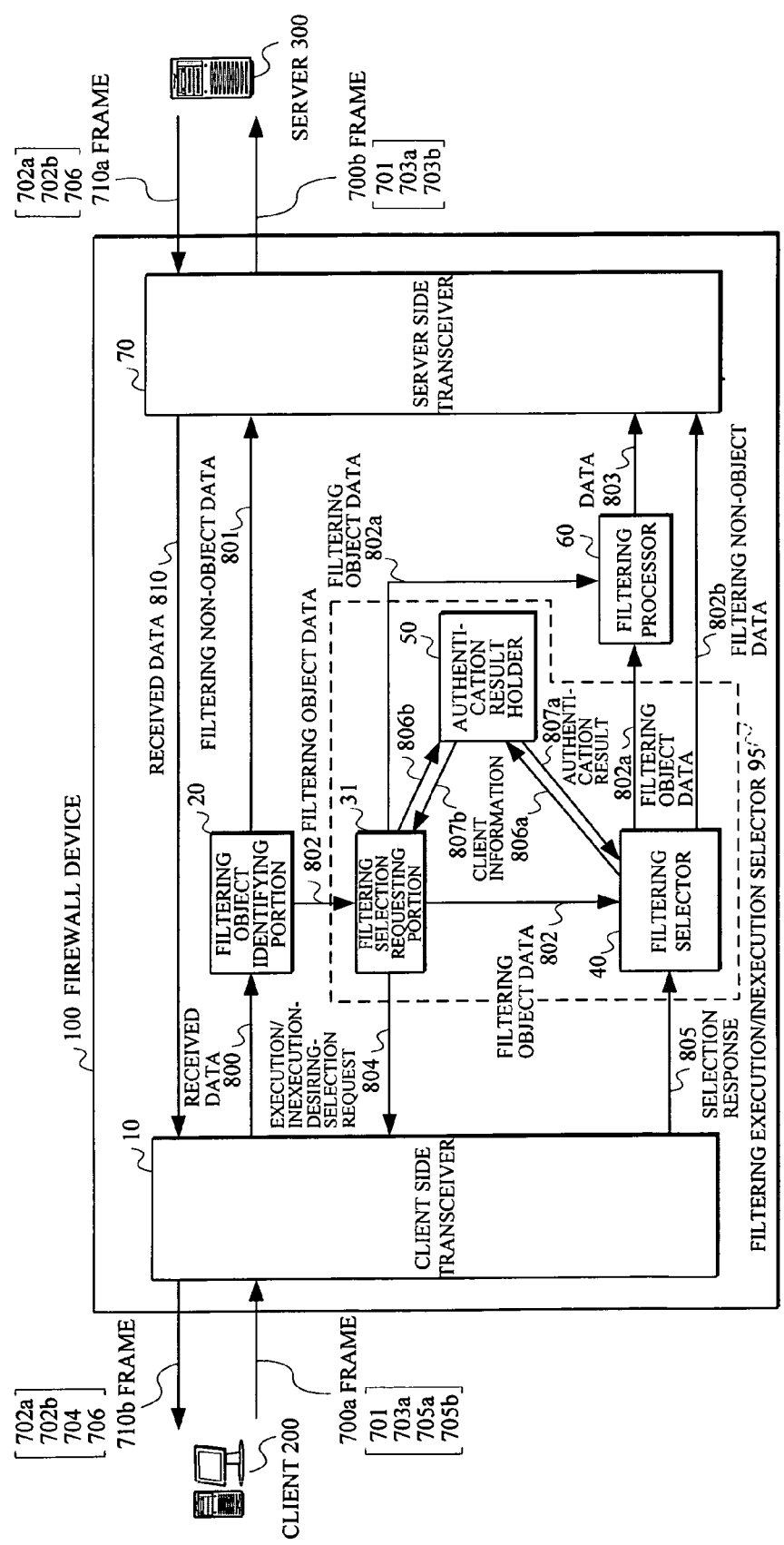
FIG. 11 is a block diagram showing an arrangement by an embodiment (2) of a firewall device according to the present invention.

FIG. 11 shows an arrangement of the firewall device 100 in the embodiment (2). This arrangement is different from that of the embodiment (1) shown in FIG. 3 in that a filtering selection requesting portion 31 is substituted for the filtering selection requesting portion 30 of the embodiment (1). The function of the filtering selection requesting portion 31 will now be described.

(3) Filtering selection requesting portion 31: An authentication of the client 200 which is the source of the filtering object data 802 is performed to the authentication result holder 50. Only when the client 200 has been already authenticated, the selection request 804 of the "desire for filtering execution/inexecution" is transmitted to the source address (address of the client 200) of the received frame. When the client 200 is unauthenticated, the received frame (filtering object data 802) is directly transmitted to the filtering processor 60.

Processing Pattern (a)

Hereinafter, the processing pattern (a) in the embodiment (2), i.e. the case where the client (site manager) 200_1 uploads the data including the script (attack pattern) to the server 300 and the "desire for filtering inexecution" is selected will be described.

Figure 12:
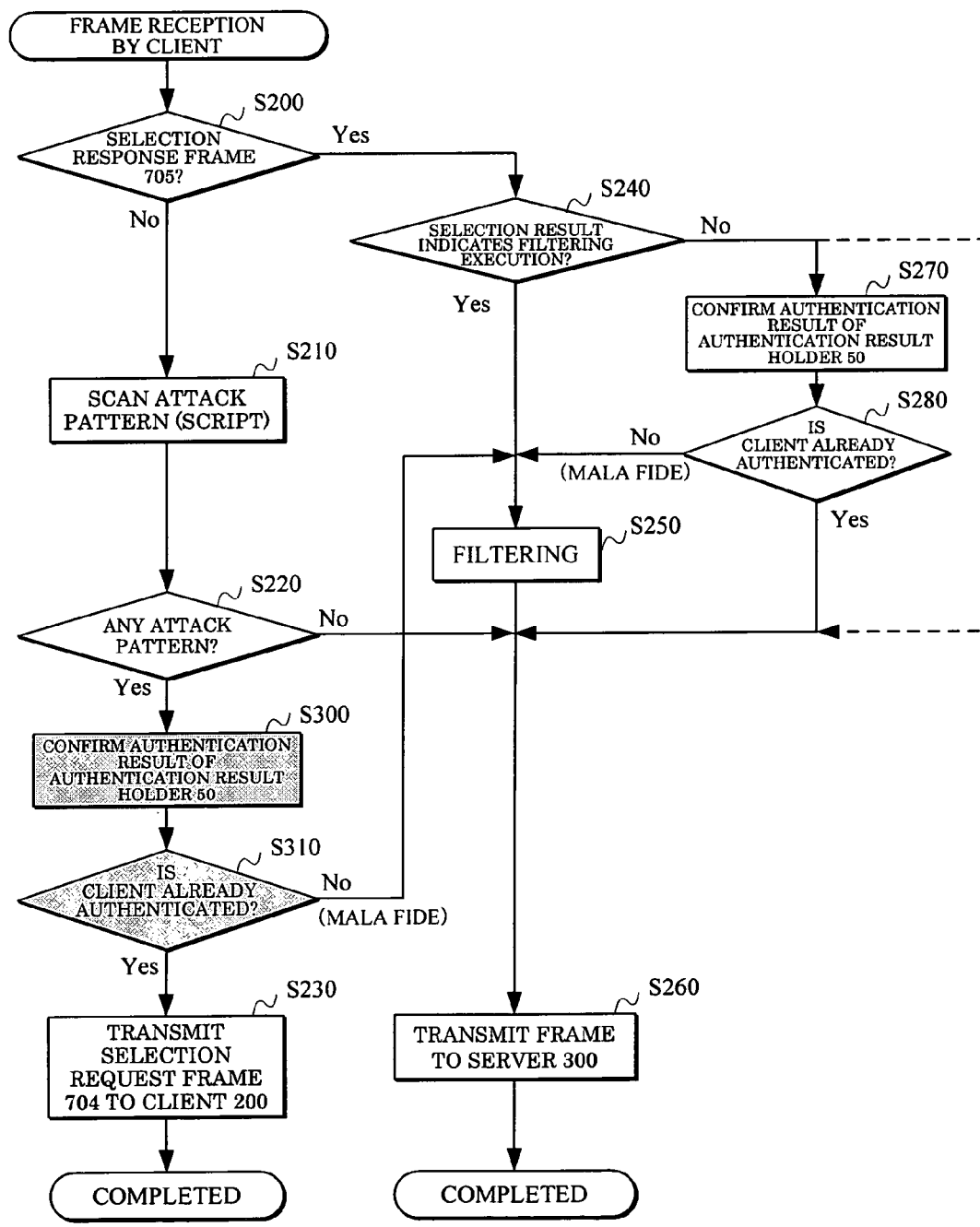
FIG. 12 is a flowchart showing an operation procedure example in an embodiment (2) of a firewall device according to the present invention.

FIG. 12 shows an operation procedure example in the embodiment (2). Steps S200-S280 within this example are the same as steps S100-S180 of the embodiment (1) shown in FIG. 5. However, the embodiment (2) is different from the embodiment (1) in that steps S300 and S310 are inserted between steps S220 and S230, as well as between steps S220 and S260.

The operation procedure example of the processing pattern (a) in the embodiment (2) will now be described referring to FIGS. 11 and 12.

The processing pattern (a) is the same as that of the embodiment (1) shown in FIG. 6 except that step T200 of the processing pattern (a) in the embodiment (1) is replaced by steps T600 and T610 (both are not shown) described below.

Step T600: The filtering selection requesting portion 30 checks whether or not the information of the client (10.0.0.1) 200_1 which is the source of the frame 703a (data 802) is registered in the authentication result holder 50 (see client information 806b, authentication result 807b in FIG. 11, and step S300 in FIG. 12).

Step T610: Since the client 200_1 is the site manager and the IP address (10.0.0.1) of the client 200_1 is registered in the authentication result holder 50 (see FIG. 4), the filtering selection requesting portion 30 transfers to the client side transceiver 10 the frame 704 (selection request 804) including the input form "selected.cgi (see FIG. 8)" of the filtering selection request for the client 200_1 (see "Yes" at step S310 and step S230). For the source at this time, the IP address (50.0.0.1) of the server 300 is set so that the frame 704 may be seen as the response to "request.cgi (see GET request at step T170 of the processing pattern (a) in the embodiment (1) mentioned above) included in the frame 703a from the client 200_1. Furthermore, the filtering selection requesting portion 30 transfers the received data 802 to the filtering selector 40.

It is to be noted that as mentioned above, this device may be led to once transmit the redirect message of the HTTP to the client 200_1 and to newly acquire the input form for this device (40.0.0.1) 100 from the client 200_1, instead of directly responding to the input form 704.

It has been described that steps S200-S280 in this operation procedure example are the same as steps S100-S180 of the operation procedure example in the embodiment (1) shown in FIG. 5. However, when the client 200 selectively inputs the frame 704 (selection response 805="desire for filtering inexecution"), the process may sequentially proceed to "Yes" at step S200, "No" at step S240, and step S260 in FIG. 12, by skipping steps S270 and S280 to omit the authentication result confirmation (see dashed line part in FIG. 12).

Thus, it becomes possible for only the source device already authenticated to select the filtering inexecution. Namely, it becomes unnecessary to perform the filtering of the received data from the source device already authenticated. Furthermore, it becomes unnecessary to transmit/receive the selection response which is a selection request of the desire for filtering execution/inexecution and its response to other devices except the source device (e.g. site manager) preliminarily having been authenticated. As a result, security becomes higher.

Processing Pattern (c)

Hereinafter, the processing pattern (c) in the embodiment (2), i.e. the case where the mala fide client 200__x uploads the frame 703a (received data 800) including the script (attack pattern) to the server 300 and the "desire for filtering inexecution" is selected will be described.

Figure 13:
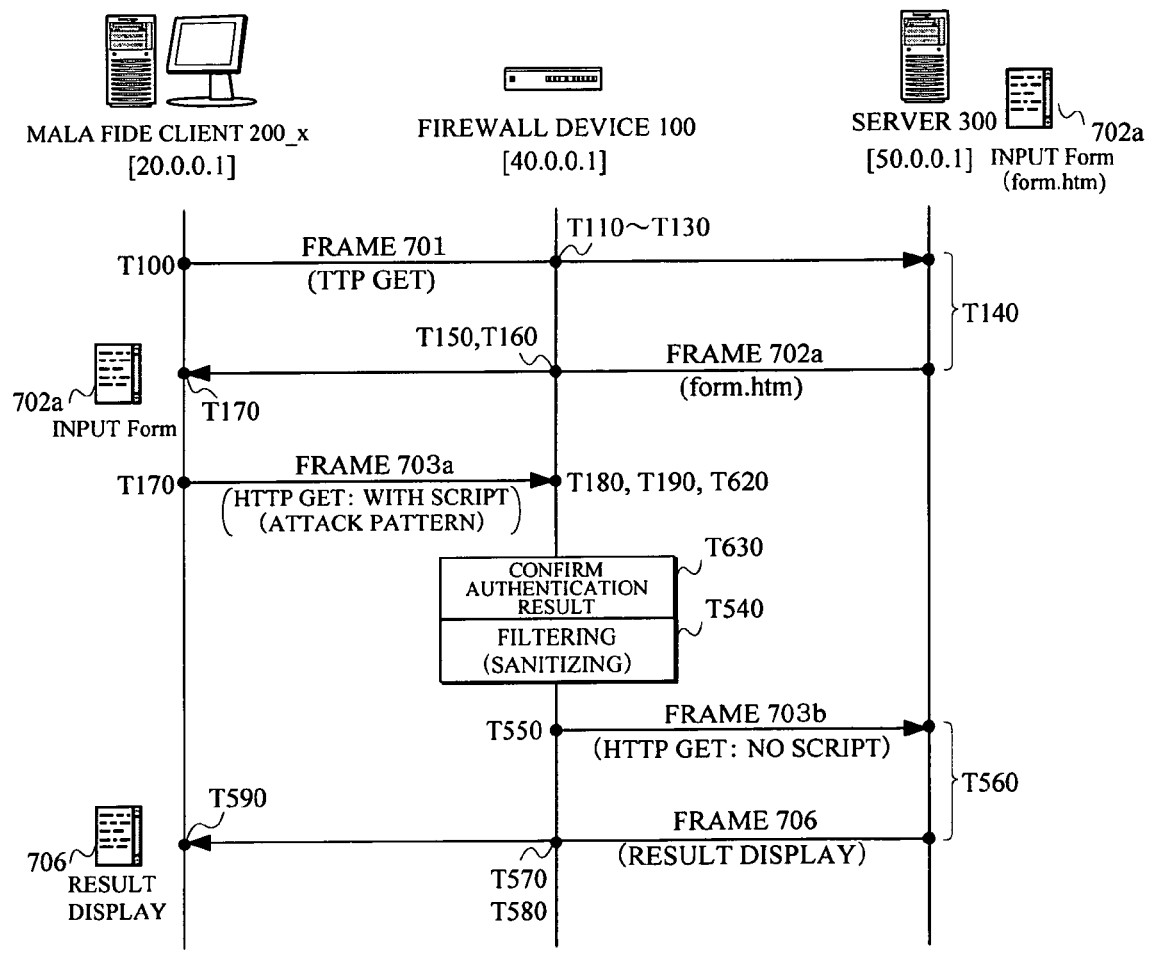
FIG. 13 is a diagram showing a frame flow of a processing pattern (c) of an arrangement (2) of a firewall device according to the present invention.

FIG. 13 shows a frame flow of the processing pattern (c) of the embodiment (2). The operation procedure of the processing pattern (c) will now be described referring to FIGS. 13, 11, and 12.

The processing pattern (c) is the same as that of embodiment (1) shown in FIG. 10 except that steps T200, T210, T500-T530 are replaced by steps T620 and T630 as described herebelow.

Step T620: The filter selection requesting portion 30 checks whether or not the IP address (20.0.0.1) information of the client 200__x which is the source of the frame 703a is registered in the authentication result holder 50 (see FIG. 4) (see step S300 in FIG. 12).

Step T630: Since the client 200__x is not the site manager, and the information of the IP address (20.0.0.1) of the client 200__x is not registered in the authentication result holder 50, the filtering selection requesting portion 30 transfers the frame (filtering object data 802*a*) 703*a* to the filtering processor 60 (see step S300, "No" at step S310, and step S250 in FIG. 12).

Since subsequent steps T540-T590 are the same as steps T540-T590 shown in FIG. 10, the descriptions thereof are here omitted. Thus, the selection form of the "filtering execution/inexecution" is transferred only to the site manager. When the mala fide client accesses, the filtering is always executed without the transmission of the selection request form of the "filtering execution/inexecution".

Embodiment (3)

Figure 14:
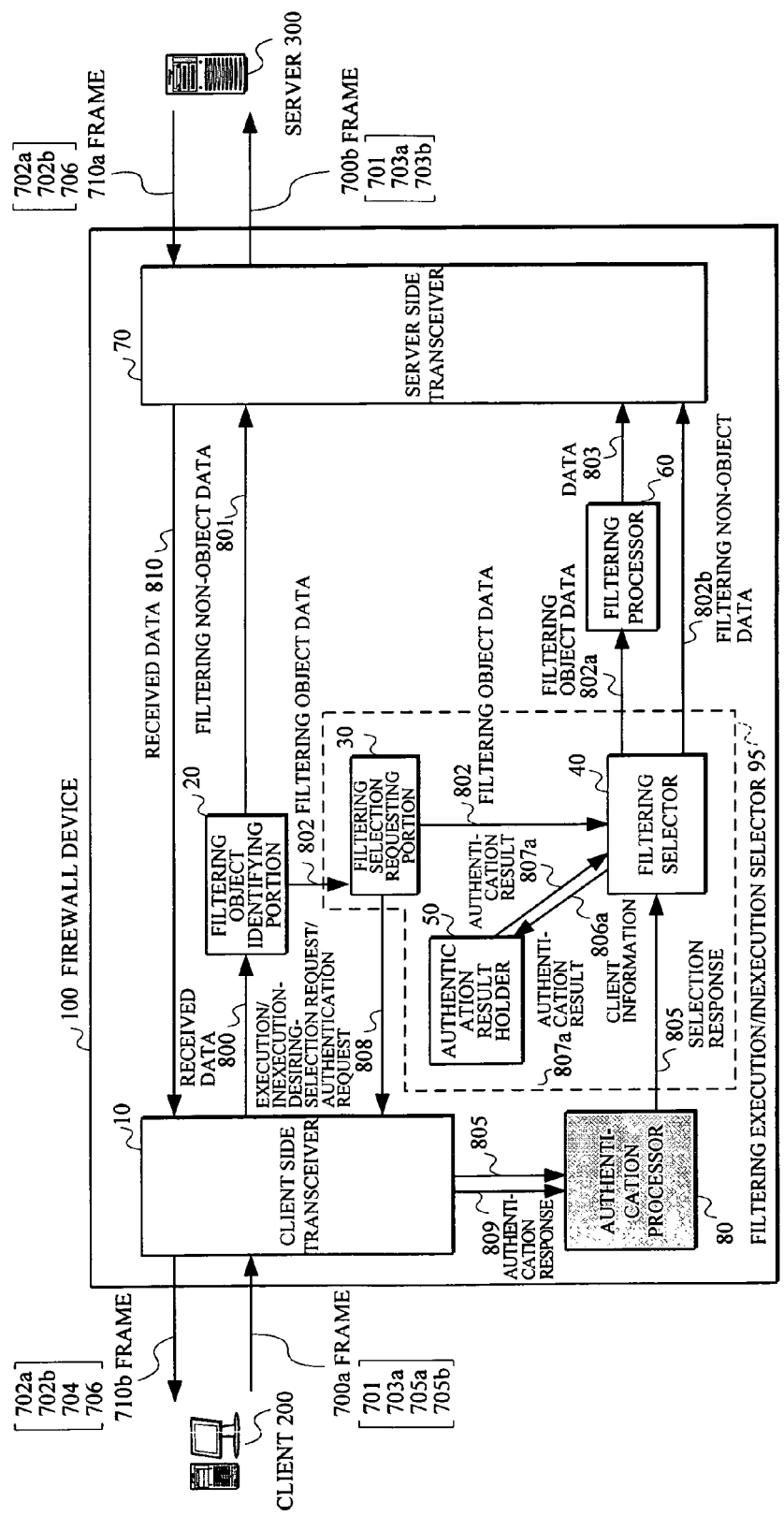
FIG. 14 is a block diagram showing an arrangement by an embodiment (3) of a firewall device according to the present invention.

FIG. 14 shows an arrangement of the firewall device 100 in the embodiment (3). This embodiment is different from that of the embodiment (1) shown in FIG. 3 in that the authentication processor 80 is inserted between the client side transceiver 10 and the filtering selector 40, and the authentication processor 80 is connected to the authentication result holder 50. Also, it is different from the embodiment (1) in that the execution/inexecution-desiring-selection request/authentication request 808 including the selection request of the "desire for filtering execution/inexecution" and the authentication request requesting the password is provided to the client side transceiver 10 instead of the selection request 804. Hereinafter, the functions of the filtering selection requesting portion 30 and the authentication processor 80 will be described.

(3) Filtering selection requesting portion 30: This requesting portion 30 transmits the selection request/authentication request 808 including the selection request and the authentication request to the source address of the received frame (see FIG. 14).

FIG. 15 shows a description example of "selected.cgi" included in the execution/inexecution-desiring-selection request/authentication request 808 (frame 708). This selection request/authentication request 808 is different from "selected.cgi" of the selection request 804 shown in FIG. 8 in that a "password input" field is added besides the "filtering inexecution/execution selection" field.

(8) Authentication processor 80: Based on the password within the response frame (authentication response 809) of the selection request/authentication request 808, the password of the client 200 is authenticated, the authentication result 807*a* being stored in the authentication result holder 50 (see FIG. 14).

Figure 16:
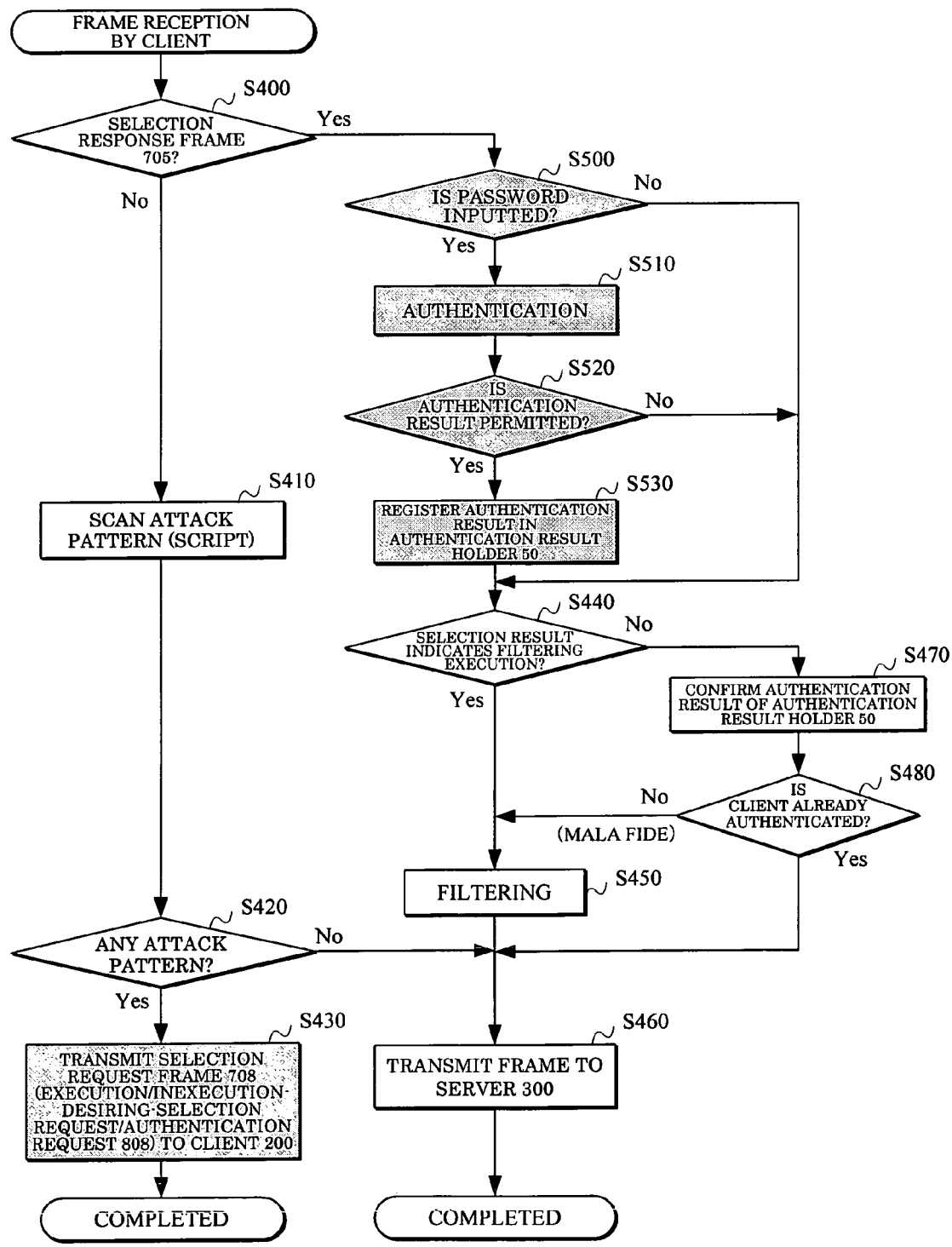
FIG. 16 is a flowchart showing an operation procedure example in an embodiment (3) of a firewall device according to the present invention.

FIG. 16 shows an operation procedure example in the embodiment (3). Steps S400-S420 and S440-S480 of this operation procedure are the same as steps S100-S120 and S140-S180 of the operation procedure in the embodiment (1) shown in FIG. 5. However, in the embodiment (3), steps S500-S530 are inserted between steps S400 and S440. Also, the embodiment (3) is different from the embodiment (1) in that the frame 708 (selection request/authentication request 808) shown in FIG. 15 is transmitted at step S430, instead of the frame 704 (selection request 804) shown in FIG. 8.

Processing Pattern (a)

The processing pattern (a) in the embodiment (3), i.e. the case where the client (site manager) 200_1 uploads the data including the script (attack pattern) to the server 300 and the "desire for filtering inexecution" is selected will now be described referring to FIGS. 6, 14, and 16.

In the processing pattern (a) of the embodiment (3), steps T200-T230 in FIG. 6 shown in the processing pattern (a) in the embodiment (1) are replaced by steps T700-T740 (not shown) described below.

Step T700: The filtering selection requesting portion 30 transfers the received data 802 (frame 703*a*) to the filtering selector 40. Furthermore, the filtering selection requesting portion 30 transfers to the client side transceiver 10 the selection request/authentication request 808 (frame 708) including the selection request of the "desire for filtering execution/inexecution" and the input form "selected.cgi (see FIG. 15)" of the authentication request requesting the password input addressed to the IP address (10.0.0.1) of the client 200_1 which is the source of the data 802. For the source of the frame 704, the address (50.0.0.1) of the server 300 is set so that the frame 704 may be seen as the response to "request.cgi from the client 200_1.

It is to be noted that this device 100 may be led to once transmit the redirect message of the HTTP to the client 200_1 and to newly acquire the input form for the IP address (40.0.0.1) of this device 100 from the client 200_1, instead of directly responding to the input form as mentioned above.

Step T710: The client side transceiver 10 transfers the frame 708 to the client 200_1 (see step S430 in FIG. 16).

Step T720: The client 200_1 receives the frame 708, and displays the input form of the frame 708. It is supposed that the site manager selects the "desire for filtering inexecution (select=1)" in the "select area" of the input form, and inputs a password "pass1" in the "password area" (see FIG. 15). The client 200_1 transmits to the IP address (50.0.0.1) of the server 300 the frame 705*a* including the GET request example of the HTTP which is the above-mentioned input result: GET http://www.test.com/selected.cgi?submit=ok&select=1-&password=pass1HTTP/1.0¥r¥n . . . .

Step T730: The client side transceiver 10 identifies that the above-mentioned frame 705*a* is a response for the selection request/authentication request (selected.cgi) 808, and transfers the selection response 805 and the authentication response 809 included in the response to the authentication processor 80 (see "Yes" at step S400).

Step T740: The authentication processor 80 confirms the password="pass1" in the "password area" of the authentication response 809, and makes the authentication result "authenticated" in this case (see "Yes" at steps S500-S520). The authentication processor 80 registers the authentication result 807*a* indicating that the client 200_1 has become "authenticated" in the authentication result holder 50 (see step S530). Furthermore, the authentication processor 80 transfers the selection response 805 to the filtering selector 40.

Since subsequent processing is the same as steps T240-T300 in the embodiment (1) in FIG. 6, the descriptions thereof are here omitted.

It is to be noted that after the information of the client 200_1 is registered in the authentication result holder 50 by the above-mentioned step T740, the processing patterns (a) and (b) of the embodiment (1) are performed in this order, thereby enabling the labor of the authentications of the second and the subsequent passwords to be omitted.

Thus, only when the received data including specific filtering object data is received, the authentication is performed. When the filtering non-object data is uploaded, the authentication can be omitted for all of the clients 200. Also, compared with the case of preliminarily performing an authentication, the source device (site manager) confirms the authentication only when data including the filtering object data is transmitted. Therefore, the site manager's labor of input can be omitted and the convenience is improved. Furthermore, when e.g. the filtering object data is uploaded, the authentication is performed when the "filtering execution/inexecution" is selected. Therefore, the frame of the mala fide client 200_*x* is filtered without fail.

Embodiment (4)

Figure 17:
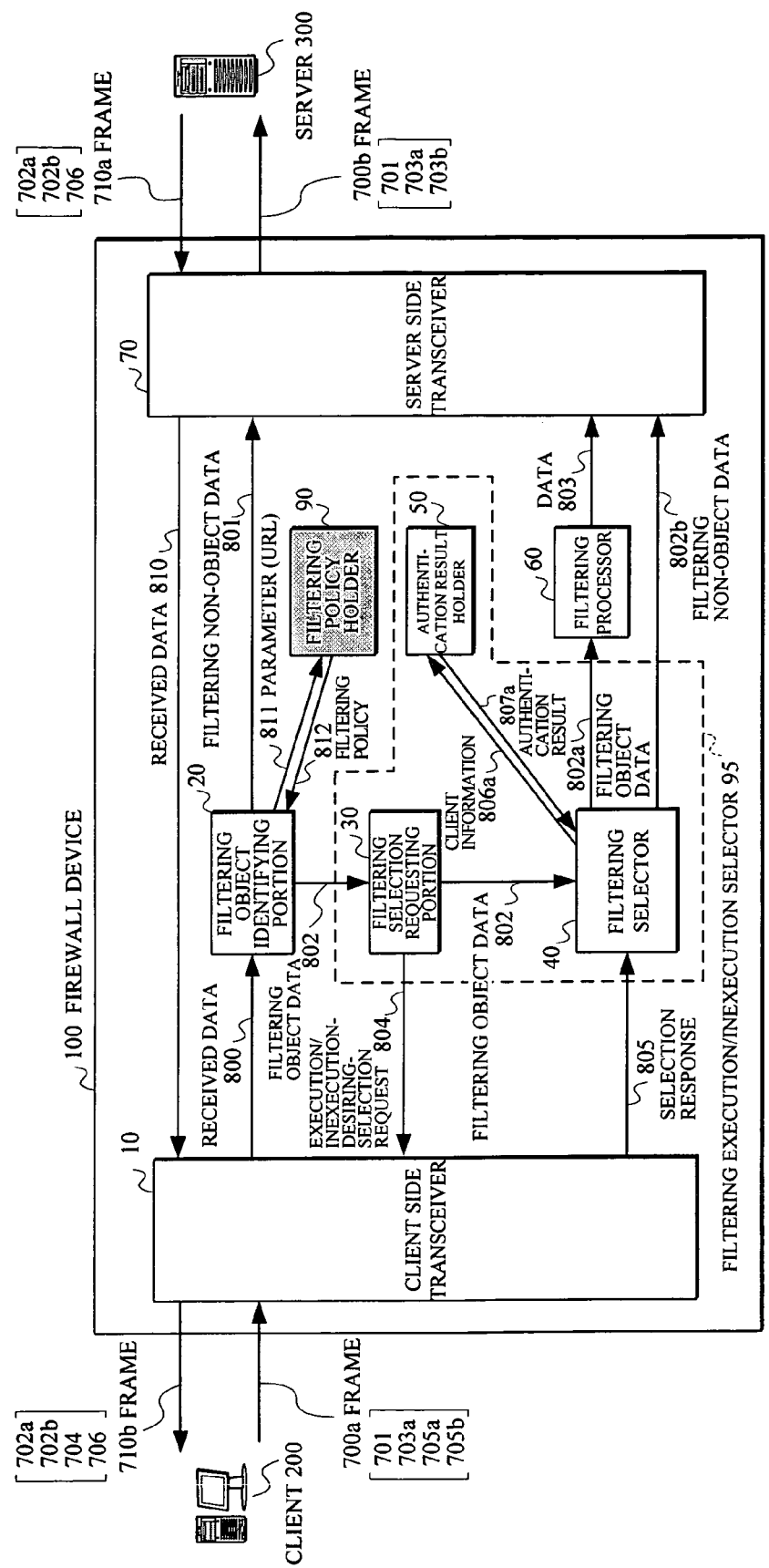
FIG. 17 is a block diagram showing an arrangement by an embodiment (4) of a firewall device according to the present invention.

FIG. 17 shows an arrangement of the firewall device 100 of the present invention in the embodiment (4). This arrangement is different from that of the embodiment (1) shown in FIG. 3 in that a filtering policy holder 90 is added and the holder 90 is connected to the filtering object identifying portion 20. The function of this holder 90 will now be described.

(10) Filtering policy holder 90: This holder 90 holds data in which the presence/absence of filtering is set per specific parameter.

Figure 18:
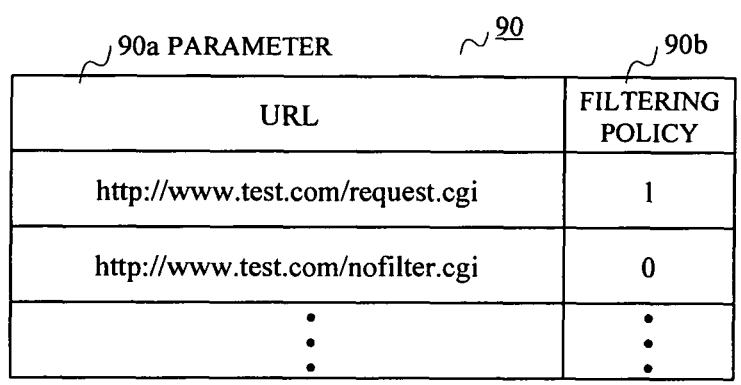
FIG. 18 is a diagram showing an arrangement of a filtering policy holder in a firewall device according to the present invention.

FIG. 18 shows an arrangement of the filtering policy holder 90 in the embodiment (4). This holder 90 is composed of a URL (Uniform Resource Locator, parameter) 90a and a filtering policy 90b. In the URL 90a, "http://www.test.com/request.cgi" and "http://www.test.com-/nofilter.cgi", . . . are registered. In the filtering policy 90b, a filtering policy of "filtering execution="1"" is preset at the time of accessing the URL 90a="http://www.test.com/request.cgi" and a filtering policy of "not execute filtering="0"" is preset at the time of accessing the URL 90a="http://www.test.com/nofilter.cgi" respectively. It is to be noted that while the filtering policy holder 90 of the embodiment (4) uses a "URL" as a parameter, a valuable or the like designating by e.g. a destination IP address and GET/POST can be used.

Figure 19:
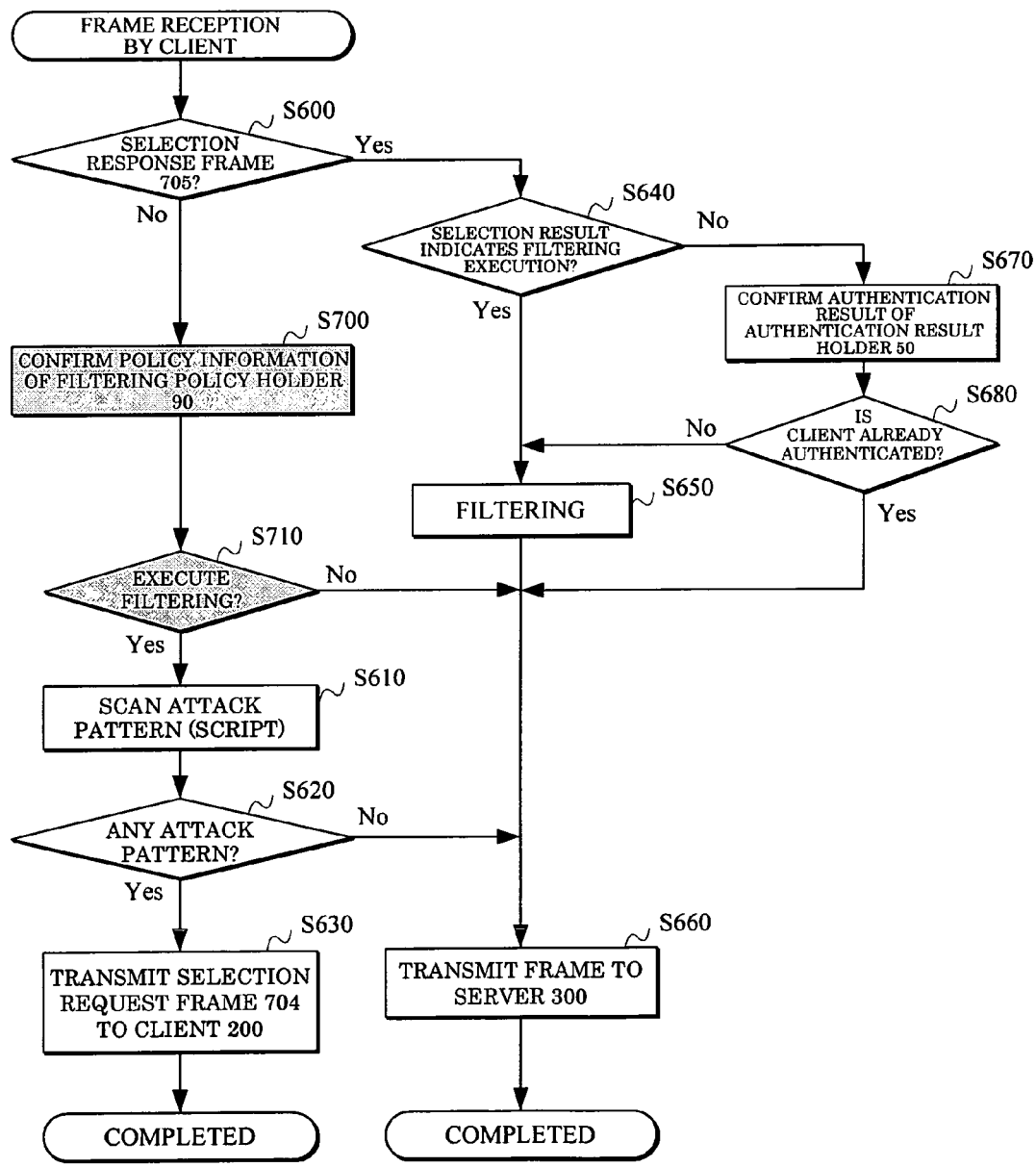
FIG. 19 is a flowchart showing an operation procedure example in an embodiment (4) of a firewall device according to the present invention.

FIG. 19 shows an operation procedure of the embodiment (4). Steps S600-S680 in the operation procedure are the same as steps S100-S180 in the embodiment (1) shown in FIG. 5. The operation procedure of the embodiment (4) is different from that of the embodiment (1) in that steps S700 and S710 are inserted between steps S600 and S610, as well as between steps S600 and S660.

Processing Pattern (a)

The processing pattern (a) in the embodiment (4), i.e. the case where the client (site manager) 200_1 uploads the data including the script (attack pattern) to the server 300 and the "desire for filtering inexecution" is selected will now be described.

In the case where an access destination of the frame 703a is http://www.test.com/reguest.cgi, the processing pattern (a) in the embodiment (4) is the same as that of the embodiment (1) shown in FIG. 6. However, the above embodiment (1) is different from this embodiment (4) in that step T190 in FIG. 6 is replaced by step T800 (not shown) described below.

Step T800: Since the access destination of the received frame 703a (received data 800) is "URL=http://www.test.com/request.cgi"; the filtering object identifying portion 20 provides this URL as a parameter 811 to the filtering policy holder 90. The filtering policy holder 90 responds to the filtering object identifying portion 20 the filtering policy 90b="filtering execution="1"" corresponding to the URL 90a="http://www.test.com/request.cgi" included in the filtering policy 812 (see step S700 in FIG. 19 and FIG. 17). Since the filtering policy is "filtering execution="1"" and the content of the frame 703a is the "GET request" including "<script>", the filtering object identifying portion 20 transfers the received data 800 as the filtering object data 802 to the filtering selection requesting portion 30 (see "Yes" at step S710, step S610, and "Yes" at step S620).

Since the processings at step T800 and subsequent steps are the same as those at steps T200-T300 in the embodiment (1), the descriptions thereof are here omitted.

In the case where the frame 703a serves to communicate for "http://www.test.com/nofilter.cgi"

Figure 20:
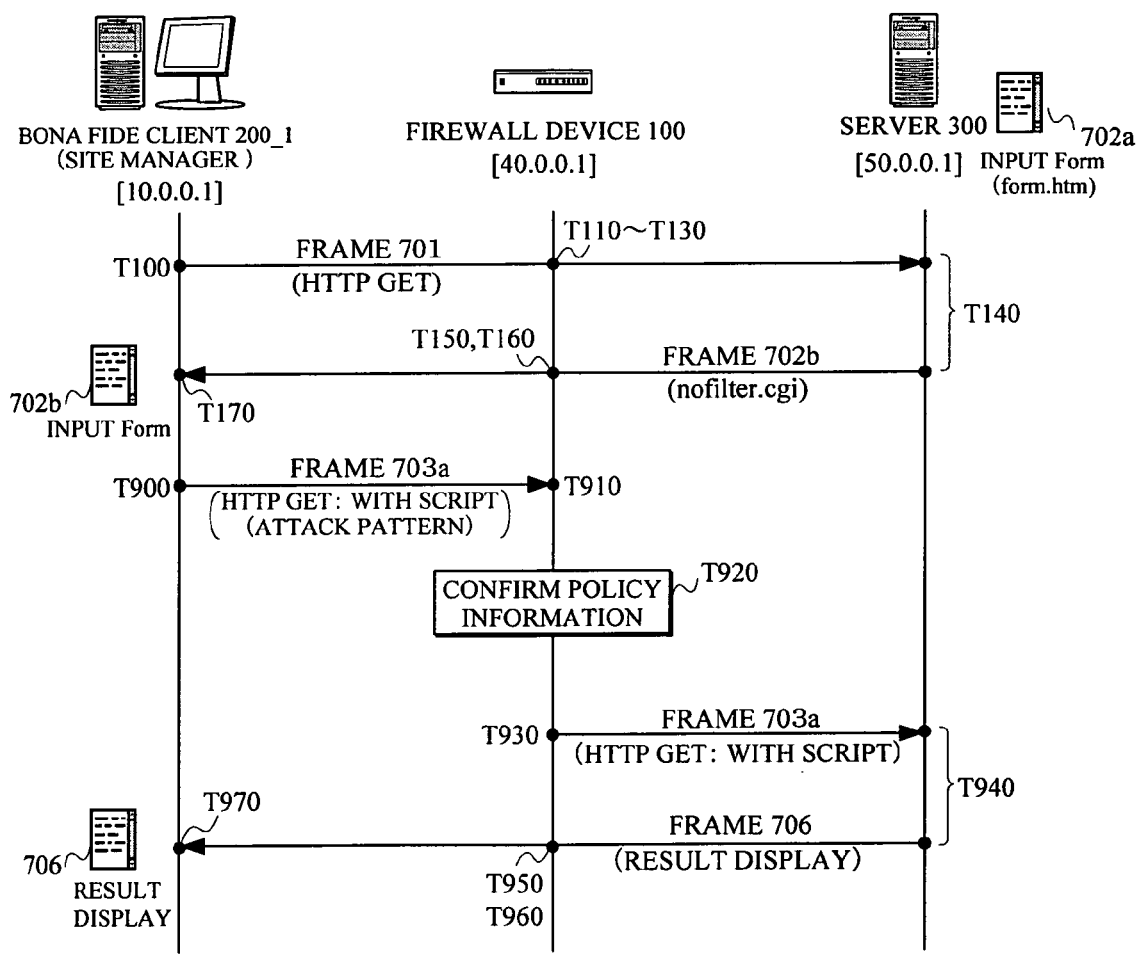
FIG. 20 is a diagram showing a frame flow for nofilter.cgi in a processing pattern (a) of an arrangement (4) of a firewall device according to the present invention.
Figure 21:
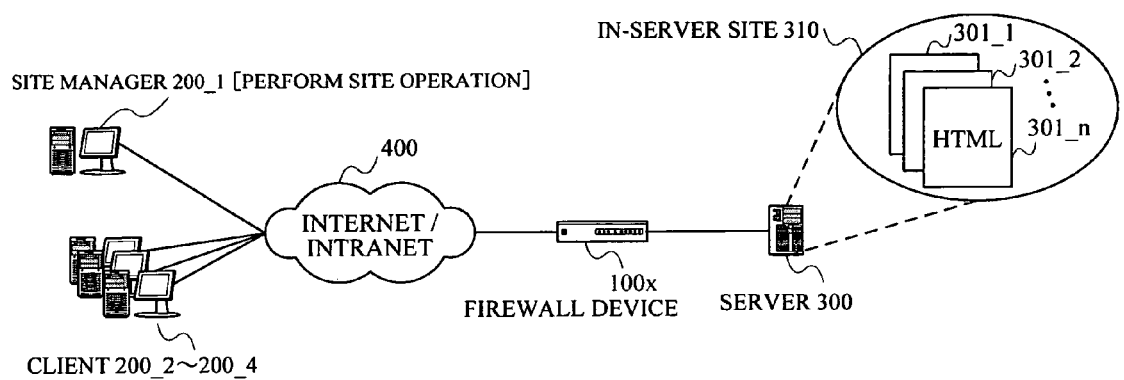
FIG. 21 is a block diagram showing a general network arrangement including a prior art firewall device.

FIG. 20 shows a case where the frame 703a serves to communicate for "http://www.test.com/nofilter.cgi" in the processing pattern (a) of the embodiment (4). In the processing pattern (a) of the embodiment (4), step T170 and subsequent steps of the processing pattern (a) in the embodiment (1) shown in FIG. 6 is replaced by steps T900-T970 described herebelow.

Step T900: The client (site manager) 200_1 receives the frame 702a, and the site manager writes the data including the script in the "field area" of the "form.htm", thereby transmitting to the IP address (50.0.0.1) of the server 300 the frame 703a including the GET request example of HTTP: GET http://www.test.com/nofiletr.cgi?field=-<script>alert('test') </script>HTTP/1.0¥r¥n . . . ).

Step T910: In the firewall device 100, the client side transceiver 10 receives the frame 703a, and transfers the frame 703a as the received data 800 to the filtering object identifying portion 20.

Step T920: The filtering object identifying portion 20 confirms an entry of the filtering policy holder 90. Since the filtering policy 90b corresponding to the URL 90a=http://www.test.com/nofilter.cgi which is the access destination of the data (frame 703a) 800 is "filtering inexecution="0"", the filtering object identifying portion 20 transfers the received data 800 (frame 703a) as the filtering non-object data 801 (frame 703a) to the server side transceiver 70 (see step S700 and "No" at step S710 in FIG. 19).

Step T930: The server side transceiver 70 transmits the frame 703a (filtering non-object data 801) to the server 300 (see step S660).

Step T940: The server 300 receives the frame 703a, processes the data including "<script>alert('test')</script>" in the "field area", and transmits the frame 706 including the page indicating the processing result to the IP address (10.0.0.1) of the client 200_1.

Step T950: In the firewall device 100, the server side transceiver 70 receives the frame 706, and transfers the frame (received data 810) 706 to the client side transceiver 10.

Step T960: The client side transceiver 10 transfers the frame 706 to the client 200_1.

Step T970: The client 200_1 receives the above-mentioned frame 706, and displays the processing result to the site manager Namely, the script <script>alert('test')</script> has been executed.

Thus, it becomes possible to identify the execution/inexecution of the filtering of the frame (received data) 703a based on the URL included in the frame 703a by referring to the filtering policy holder 90. Namely, it becomes possible to designate the execution/inexecution of the filtering for a specific site/input field.

It is to be noted that the present invention is not limited to the above-mentioned embodiments and it is obvious that various modifications may be made by one skilled in the art based on the recitation of the claims.

What is claimed is:

1. A firewall device, comprising:
   a transceiver receiving data transmitted from a source device;
   a filtering object identifying portion identifying received data including filtering object data;
   a filtering processor; and
   a filtering execution/inexecution selector
      transmitting to the source device of the received data, when the received data includes the filtering object data, a selection request of a filtering execution or filtering inexecution of the received data, and
      not executing filtering of the received data from the source device when a response from the source device to the selection request indicates filtering inexecution, and the source device is authenticated, but otherwise executing filtering of the received data by the filtering processor to filter the filtering object data included in the received data, and wherein the filtering execution/inexecution selector comprises an authentication result holder, a filtering selection requesting portion, and a filtering selector;

the authentication result holder holds an authentication result of the source device;

the filtering selection requesting portion transmits to the source device of the received data the selection request of the filtering execution or filtering inexecution of the received data; and the filtering selector does not execute filtering of the received data including the filtering object data from the source device when the response from the source device to the selection request indicates filtering inexecution and the source device is authenticated in the authentication result, but otherwise executes filtering of received data including the filtering object data.

2. The firewall device as claimed in claim 1, wherein the filtering execution/inexecution selector comprises an authentication result holder, a filtering selection requesting portion, and a filtering selector;

the authentication result holder holds an authentication result of the source device;

the filtering selection requesting portion executes filtering of the received data when the source device is unauthenticated in the authentication result, and transmits the selection request to the source device authenticated in the authentication result; and the filtering selector does not execute filtering of the received data from the source device authenticated when the response from the source device to the selection request indicates filtering inexecution, but otherwise executes filtering of received data including the filtering object data.

3. The firewall device as claimed in claim 1, further comprising
an authentication processor;
the filtering selection requesting portion further transmitting an authentication request to the source device, and the authentication processor performing an authentication of the source device based on an authentication response to the authentication request and registering the authentication result in the authentication result holder.

4. The firewall device as claimed in claim 1, further comprising
a filtering policy holder holding a filtering policy which determines the filtering execution or inexecution of the received data in association with parameters included in the received data;
the filtering object identifying portion providing the received data to the filtering execution/inexecution selector only when the filtering policy indicates filtering execution.

5. The firewall device as claimed in claim 1, wherein the filtering comprises sanitizing the filtering object data, or discarding the received data.

6. The firewall device as claimed in claim 1, wherein the filtering object data is preset in the filtering object identifying portion.

7. The firewall device as claimed in claim 3, wherein the filtering selection requesting portion transmits the authentication request and the selection request concurrently to the source device.

8. The firewall device as claimed in claim 4, wherein the parameters comprise a destination address, a URL, or a variable value designated by a GET or a POST of the received data to determine the filtering policy based on the parameters.

* * * * *